United States Patent
Yasuda

(10) Patent No.: US 9,052,525 B2
(45) Date of Patent: Jun. 9, 2015

(54) IMAGE SHAKE CORRECTION APPARATUS, AND OPTICAL EQUIPMENT AND IMAGING DEVICE PROVIDED WITH SAME

(71) Applicant: CANON KABUSHIKI KAISHA, Tokyo (JP)

(72) Inventor: Hiromu Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/031,546

(22) Filed: Sep. 19, 2013

(65) Prior Publication Data

US 2014/0099087 A1    Apr. 10, 2014

(30) Foreign Application Priority Data

Oct. 10, 2012 (JP) .................................. 2012-225132

(51) Int. Cl.
  *G03B 17/00*  (2006.01)
  *G02B 27/64*  (2006.01)
  *G03B 5/02*   (2006.01)

(52) U.S. Cl.
  CPC ............... *G02B 27/646* (2013.01); *G03B 5/02* (2013.01)

(58) Field of Classification Search
  CPC ............... G03B 2205/00; G03B 2205/0007; G03B 2205/0015; G03B 2205/0023; G03B 5/00–5/04; H04N 5/23248; H04N 5/23287

USPC ................. 396/55; 348/208.99, 208.4, 208.7; 359/554
  See application file for complete search history.

(56) References Cited

U.S. PATENT DOCUMENTS

2003/0044175 A1* 3/2003 Enomoto ......................... 396/55
2010/0157071 A1* 6/2010 Lee ............................. 348/208.2

FOREIGN PATENT DOCUMENTS

| JP | 10-10597 A    | 1/1998 |
| JP | 2010-152020 A | 7/2010 |

* cited by examiner

*Primary Examiner* — Clayton E LaBalle
*Assistant Examiner* — Minh Phan
(74) *Attorney, Agent, or Firm* — Cowan, Liebowitz & Latman, P.C.

(57) ABSTRACT

An image shake correction apparatus includes a fixed member; a movable member configured to hold a correcting member that corrects image shake and configured to have a first connecting unit and a second connecting unit; a first moving member connected to the first connecting unit, and configured to move the movable member in a first direction via the first connecting unit; a second moving member connected to the second connecting unit, and configured to move the movable member in a second direction different from the first direction via the second connecting unit; a first drive unit configured to drive the first moving member; and a second drive unit configured to drive the second moving member independently of driving of the first moving member. The first drive unit and the second drive unit share a constituent component.

8 Claims, 18 Drawing Sheets

IMAGE SHAKE CORRECTION APPARATUS, AND OPTICAL EQUIPMENT AND IMAGING DEVICE PROVIDED WITH SAME

BACKGROUND OF THE INVENTION

1. Field of the Invention

The present invention relates to an image shake correction apparatus, and to optical equipment and imaging devices provided therewith.

2. Description of the Related Art

Image shake correction apparatuses have been proposed which are incorporated into imaging devices such as digital cameras for purposes of correcting image shake due to device shake of an imaging device. An image shake correction apparatus has, for example, a function which rotates as necessary a movable member that holds a lens or an imaging element in a lateral direction (yaw direction) and a vertical direction (pitch direction) viewed from an optical axis direction, and which conducts drive control in a plane that is perpendicular to the optical axis.

Now, an image shake correction apparatus has been proposed wherein the movable member is directed by a guide shaft and a guide groove provided in the movable member and a fixed member, and the directions in which the movable member can move are the two directions of rotational movement centered on the guide shaft and translational movement along the guide groove (see Japanese Patent Laid-Open No. H10-10597 and Japanese Patent Laid-Open No. 2010-152020).

The image shake correction apparatus disclosed in Japanese Patent Laid-Open No. H10-10597 uses drive units in which motors drive feed screws in the yaw direction and the pitch direction. The site where the yaw-direction drive unit operates is an elongate hole that extends in the pitch direction, and the site where the pitch-direction drive unit operates is an elongate hole that extends in the yaw direction. Consequently, the movements of the respective drive units are independently conveyed to the movable member. However, with this image shake correction apparatus, depending on the position of the movable member, for example, a locus of working points of the feed screw in the yaw direction when the pitch-direction motor is driven is not linear, but is a planar locus that changes according to the positions of the respective motors. Accordingly, in the case where a drive unit such as a feed screw that is only driven in one direction is used, when the movable member is moved beyond a range where the locus of working points can resemble a straight line, twisting occurs at the site where the feeding screw is operated. Therefore, it is difficult to increase the movable range of the movable member.

On the other hand, the image shake correction apparatus disclosed in Japanese Patent Laid-Open No. 2010-152020 uses a flat voice coil motor (a motor using a coil wherein the central axis of winding is perpendicular to the mobile surface). With this motor, as drive force can be exerted even when there is two-dimensional movement of the coil relative to the magnet, twisting does not occur even if the amount of mobility is increased, and the lens holding member can be planarly driven. However, with this image shake correction apparatus, when one of the voice coil motors is driven, the relative position of the coil to the magnet changes in the other voice coil motor, reducing the area of opposition, thereby reducing motor efficiency, and inhibiting increases in the amount of mobility of the movable member.

SUMMARY OF THE INVENTION

The present invention provides an image shake correction apparatus which prevents twisting and reduced motor efficiency, and which enables an increase in an amount of mobility of a movable member that holds a correcting member for correcting image shake.

According to an aspect of the present invention, an image shake correction apparatus is provided that includes a fixed member; a movable member configured to hold a correcting member that corrects image shake, which is supported so as to be movable in a direction perpendicular to an optical axis relative to the fixed member, and configured to have a first connecting unit and a second connecting unit; a first moving member connected to the first connecting unit, and configured to move the movable member in a first direction via the first connecting unit; a second moving member connected to the second connecting unit, and configured to move the movable member in a second direction different from the first direction via the second connecting unit; a first drive unit configured to drive the first moving member; and a second drive unit configured to drive the second moving member independently of driving of the first moving member by the first drive unit. The first drive unit and the second drive unit share a constituent component.

According to the present invention, operation of two drive units can be independently conducted so that with respect to first and second moving members, one of the moving members does not move even when the other moving member is moved. Consequently, twisting and reduced motor efficiency can be avoided, and the amount of mobility of the movable member can be increased.

Further features of the present invention will become apparent from the following description of exemplary embodiments with reference to the attached drawings.

DESCRIPTION OF THE EMBODIMENTS (First Embodiment)

A description is now given of an image shake correction apparatus of first embodiment of the present invention with reference to FIGS. 1 to 6. The image shake correction apparatus of the present embodiment is incorporated into imaging devices such as digital cameras or digital video cameras, or optical equipment such as interchangeable lenses of single-lens reflex cameras, lens barrel units, binoculars, and telescopes (the same applies to the other embodiments described below).

Figure 1:
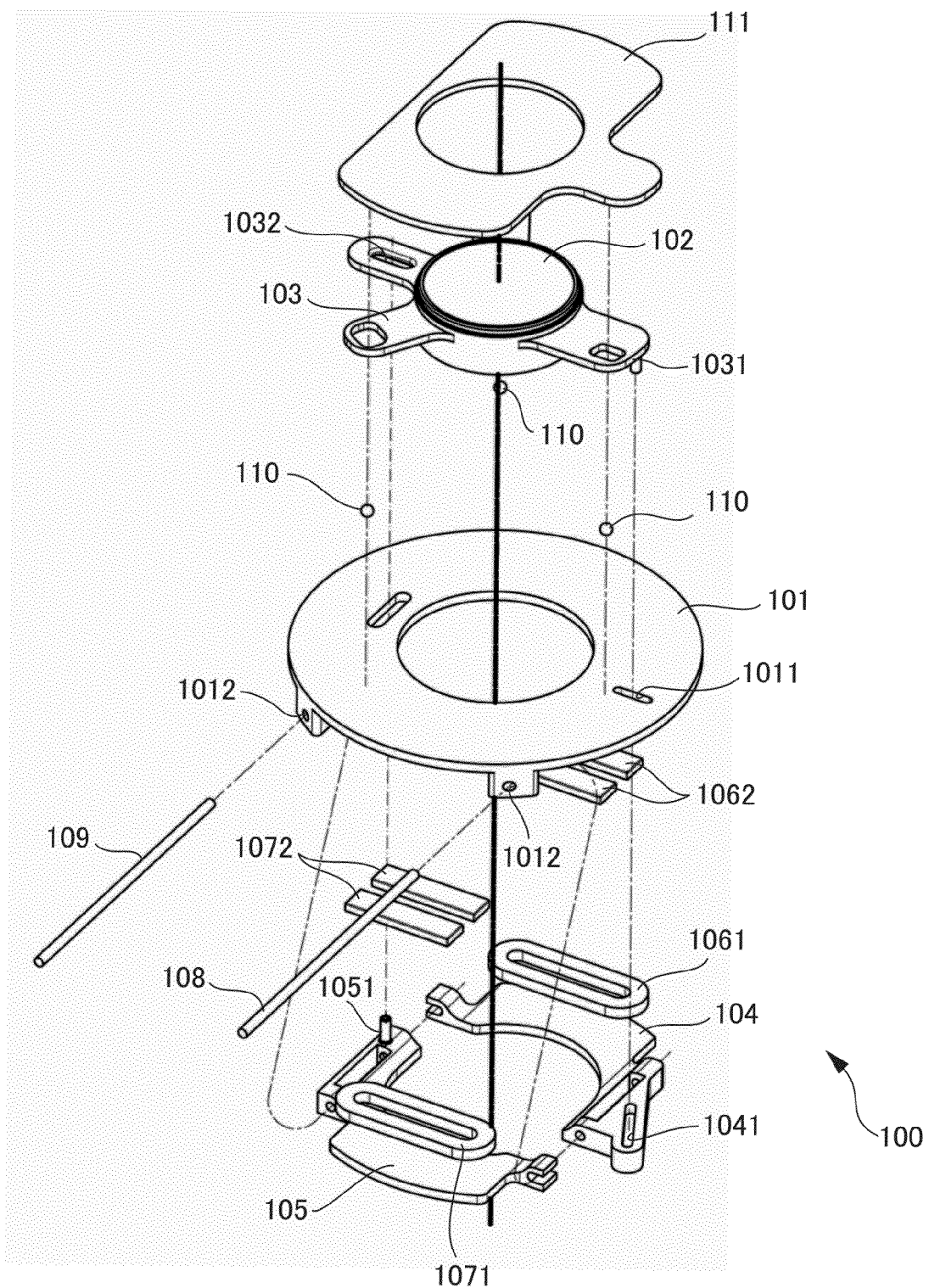
FIG. 1 is an exploded perspective view of an image shake correction apparatus of first embodiment.
Figure 2:
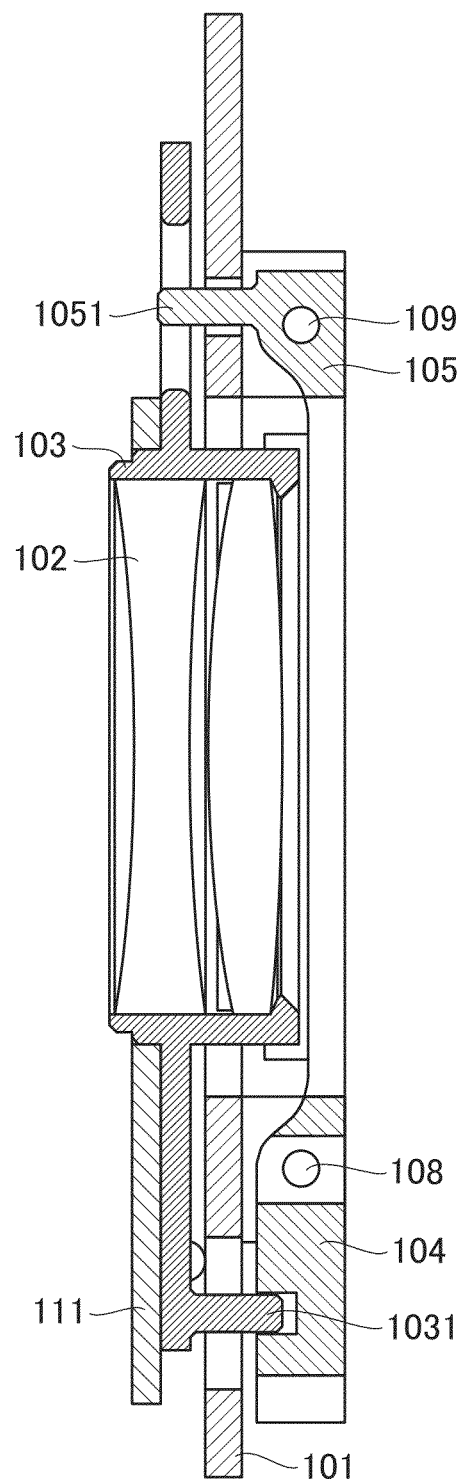
FIG. 2 is a cross-sectional view of the image shake correction apparatus of FIG. 1 after assembly.
Figure 3:
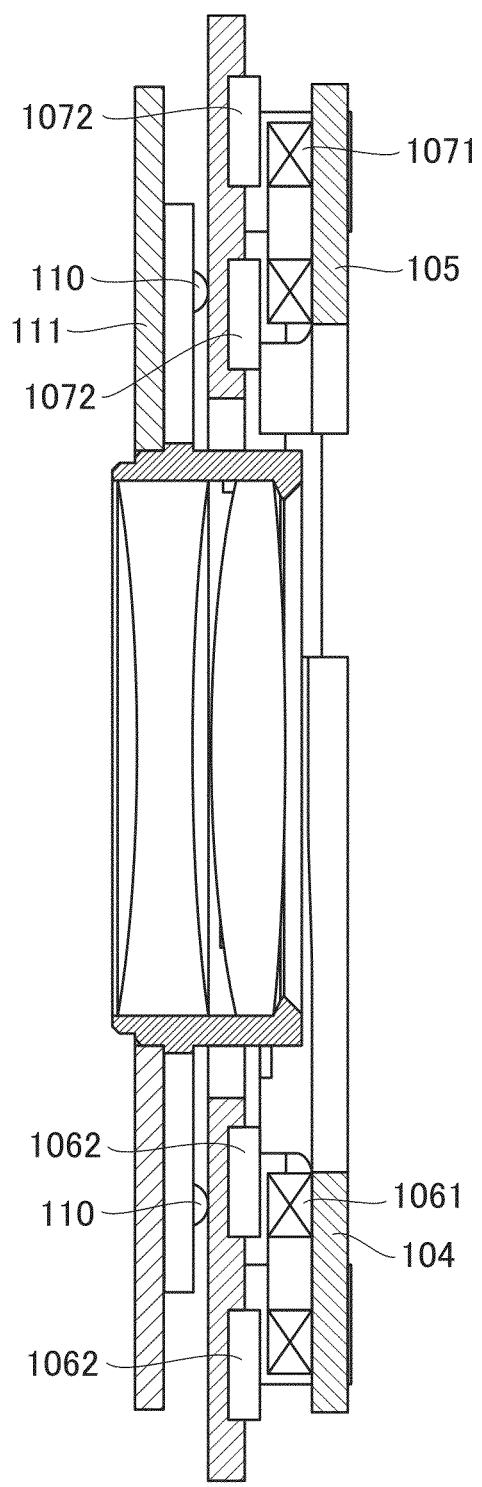
FIG. 3 is a cross-sectional view in a plane perpendicular to FIG. 2.
Figure 4:
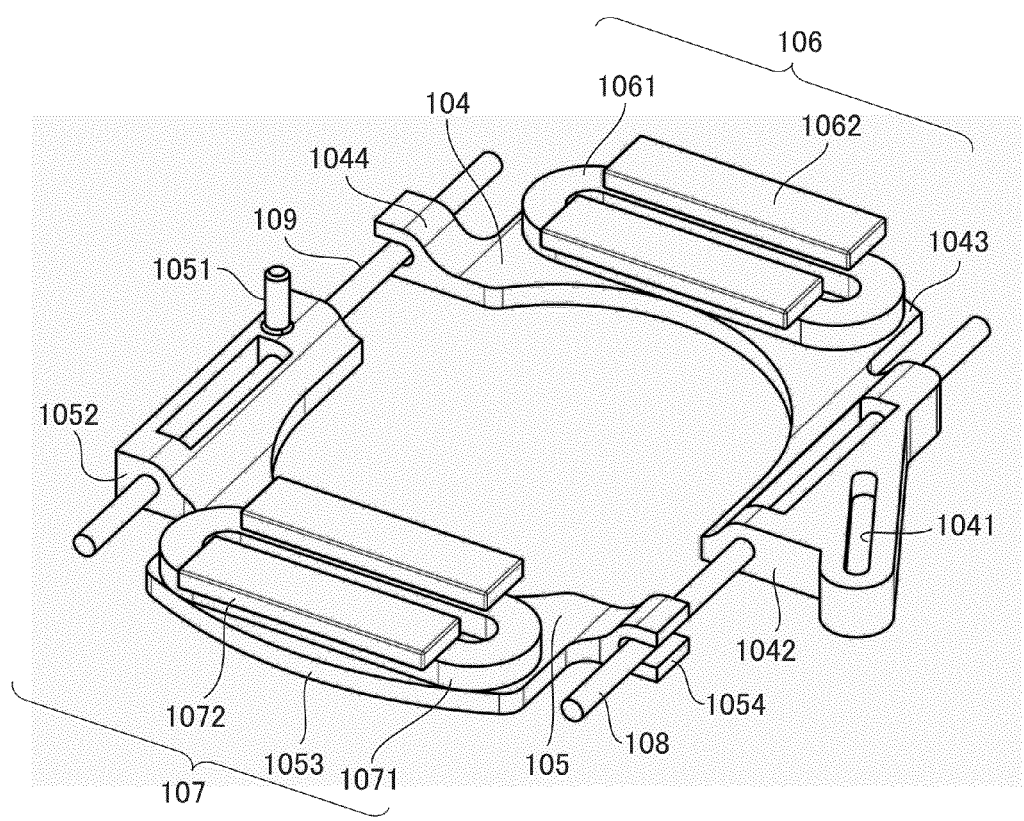
FIG. 4 is a perspective view of components of a portion of the image shake correction apparatus of first embodiment.

Firstly, a description is given of components configuring the image shake correction apparatus of the present embodiment using FIGS. 1 to 4. FIG. 1 is an exploded perspective view illustrating a configuration of components of an image shake correction apparatus. FIG. 2 is a cross-sectional view of the image shake correction apparatus after assembly in a plane parallel to the optical axis. FIG. 3 is a cross-sectional view in a plane that parallels the optical axis and that is perpendicular to the cross-section shown in FIG. 2. FIG. 4 is a perspective view of components of a portion of the image shake correction apparatus shown in FIG. 1.

An image shake correction apparatus 100 of the present embodiment is provided with a fixed ground plate (a fixed member) 101, an image shake correcting lens 102, a lens holding member 103, a first moving member 104, a second moving member 105, a first drive unit 106, and a second drive unit 107. In addition, the image shake correction apparatus 100 is provided with a first guide shaft 108, a second guide shaft 109, rolling balls 110, and the yoke 111. The first drive unit 106 is provided with a first coil (a second component) 1061 and a first magnet (a first component) 1062, while the second drive unit 107 is provided with a second coil (a third component) 1071 and a second magnet (a first component) 1072.

The fixed ground plate 101 is formed in an approximately discoid shape in the present embodiment, and is a fixed member which is fixed in a lens barrel that fixes another lens group (e.g., an imaging optical system). The fixed ground plate 101 has an aperture at the center which is larger than the contour of a lens holding member, and which can accommodate the lens holding member 103. The movable range of the lens holding member 103 is regulated by this aperture. The fixed ground plate 101 has a fixed guide groove 1011 extending in the yaw direction as a first guide unit, and is provided with a bar support 1012 that holds two guide shafts 108 and 109.

The image shake correcting lens 102 is a lens that configures a portion of an imaging optical system (not illustrated in the drawings), and is a correcting optical system that imparts bias to an optical axis. An image produced by an imaging optical system can be moved by moving in a direction perpendicular to the optical axis, e.g., in a plane perpendicular to the optical axis. When camera shake due thereto is detected, the stability of the image plane can be ensured by moving the image shake correcting lens 102 in an offsetting direction. That is, the image shake correcting lens 102 functions as a correcting member that corrects image shake.

The lens holding member 103 is a movable member (movable lens barrel) which holds the image shake correcting lens 102 in a central aperture. The lens holding member 103 is movably supported on the fixed ground plate 101 in a plane perpendicular to the optical axis. The lens holding member 103 is provided with a first drive pin (a first connecting unit) 1031 and an elongate hole (a second connecting unit) 1032. The first drive pin 1031 functions as a first connecting unit, and the elongate hole 1032 functions as a second connecting unit.

The first drive pin 1031 extends in the direction of the optical axis, and fits together with the fixed guide groove 1011 provided in the fixed ground plate 101, and a cam groove 1041 provided in the first moving member 104. The cam groove 1041 functions as a second guide unit. The elongate hole 1032 fits together with a second drive pin 1051 that is provided in the second moving member 105, and that extends in the direction of the optical axis. The drive pin 1051 functions as a third guide unit. The elongate hole 1032 is designed so that when extension is conducted in the lengthwise direction of the elongate hole 1032, the center of the image shake correcting lens 102 and the center of the first drive pin 1031 are transited.

As shown in FIG. 4, the first moving member 104 is provided with the cam groove 1041, a sleeve unit 1042, a coil holder 1043, and a rotation prevention part 1044. The sleeve unit 1042 fits together with the first guide shaft 108. The coil holder 1043 supports the first coil 1061. The rotation prevention part 1044 fits together with the second guide shaft 109. Guided by the first guide shaft 108 and the second guide shaft 109, the first moving member 104 is held so that it is capable of translational movement in the direction of extension of the first guide shaft 108.

As shown in FIG. 4, the second moving member 105 is configured by a second guide shaft 1051, a sleeve unit 1052, a coil holder 1053, and a rotation prevention part 1054. The sleeve unit 1052 fits together with the second guide shaft 109. The coil holder 1053 holds the second coil 1071. The rotation prevention part 1054 fits together with the first guide shaft 108. Guided by the first guide shaft 108 and the second guide shaft 109, the second moving member 105 is held so that it is capable of translational movement in the direction of extension of the second guide shaft 109. Otherwise, in the present embodiment, the first guide shaft 108 and the second guide shaft 109 are arranged in parallel.

The first drive unit 106 is a voice coil motor that is well known, and drives the first moving member 104. The first drive unit 106 is provided with the first coil 1061 and the first magnet 1062. The first coil 1061 is wound in an oval shape, and is attached to the first moving member 104. The first coil 1061 is energized by a power supply method that is not illustrated in the drawings, generating Lorentz force in a direction perpendicular to the electric current.

On the other hand, the first magnet 1062 is attached to the fixed ground plate 101 so as to oppose the first coil 1061 (FIG. 3). The opposed surface of the first magnet 1062 that faces the first coil 1061 is magnetized. Consequently, when the first coil 1061 is energized, magnetic flux is produced that passes through the first coil 1061.

The second drive unit 107 is a voice coil motor that is well known, and drives the second moving member 105. The second drive unit 107 is provided with the second coil 1071 and the second magnet 1072. The second coil 1071 is wound in an oval shape, and is attached to the second moving member 105. The second coil 1071 is energized by a power supply method that is not illustrated in the drawings, generating Lorentz force in a direction perpendicular to the electric current.

The second magnet 1072 is attached to the fixed ground plate 101 so as to oppose the second coil 1071 (FIG. 3). The opposed surface of the second magnet 1072 that faces the second coil 1071 is magnetized. Consequently, when the second coil 1071 is energized, magnetic flux is produced that passes through the second coil 1071. Otherwise, in the present embodiment, the drive direction of the first drive unit 106 and the drive direction of the second drive unit 107 are mutually parallel or on the same straight line.

The first guide shaft 108 is a cylindrical member that extends in the pitch direction. The first guide shaft 108 is, for example, manufactured with a metal such as stainless steel that has a high degree of slideability, precision, and strength.

The first guide shaft 108 guides the first moving member 104 in the pitch direction by fitting together with the sleeve unit 1042 of the first moving member 104. The first guide shaft 108 also prevents the second moving member 105 from rotating around the second guide shaft 109 by fitting together with the rotation prevention part of the second moving member 105.

The second guide shaft 109 is a cylindrical member that extends in the pitch direction. The second guide shaft 109 is, for example, manufactured with a metal such as stainless steel that has a high degree of slideability, precision, and strength.

The second guide shaft 109 guides the second moving member 105 in the pitch direction by fitting together with the sleeve unit 1052 of the second moving member 105. The second guide shaft 109 also prevents the first moving member 104 from rotating around the first guide shaft 108 by fitting together with the rotation prevention part of the second moving member 105.

The rolling balls 110 conduct rolling support of the movable member on the fixed ground plate 101. In the present embodiment, the number of rolling balls 110 is three, and the movable member moves on a plane formed by the three rolling balls 110. As the rolling balls 110 are given a reduced rolling resistance, and are produced to a high degree of machining accuracy, they are formed from material that is high in hardness such as stainless steel or ceramics.

The yoke 111 is a tabular member of soft magnetic material, and is fixed to the lens holding member 103. The yoke 111 is larger than the movable range of the rolling balls 110, and is constantly in contact with the rolling balls 110. In addition, the yoke 111 opposes the first magnet 1062 and the second magnet 1072, and functions as a yoke of the first drive unit 106 and the second drive unit 107. By using the yoke 111 as a magnetic path of the first magnet 1062 and the second magnet 1072, the magnetic field that is exerted on the first coil 1061 and the second coil 1072 can be effectively used.

In the present embodiment, the yoke 111 is fixed to the lens holding member 103, and the magnet is fixed to the fixed ground plate 101. Consequently, the lens holding member 103 can be moved to one side by magnetic force produced between the yoke 111 and the magnet.

Next, the structure of the image shake correction apparatus of first embodiment is described. With the image shake correction apparatus 100 of the present embodiment, the lens holding member 103 that holds the image shake correcting lens 102 and the yoke 111 function as a movable member by being fixed. The movable member is given rolling support by the three rolling balls so that it is capable of moving on the fixed ground plate in a plane perpendicular to the optical axis.

The first magnet 1062 and the second magnet 1072 are attached to the fixed ground plate so that one magnetized surface opposes the yoke 111, and the other magnetized surface opposes the coil. The rolling balls 110 are sandwiched by the movable member and the fixed ground plate 101 by the magnetic force of the yoke 111 and the magnet. The disposition thereof is shown in FIG. 3.

The first moving member 104 is supported by the first guide shaft 108 and the second guide shaft 109 attached to the fixed ground plate 101 so that it can move in the pitch direction. The first moving member 104 can be moved by Lorentz force produced by energization of the first coil 1061.

The second moving member 105 is supported by the first guide shaft 108 and the second guide shaft 109 attached to the fixed ground plate 101 so that it can move in the pitch direction. The second moving member 105 can be moved by Lorentz force produced by energization of the second coil 1071.

Figure 5:
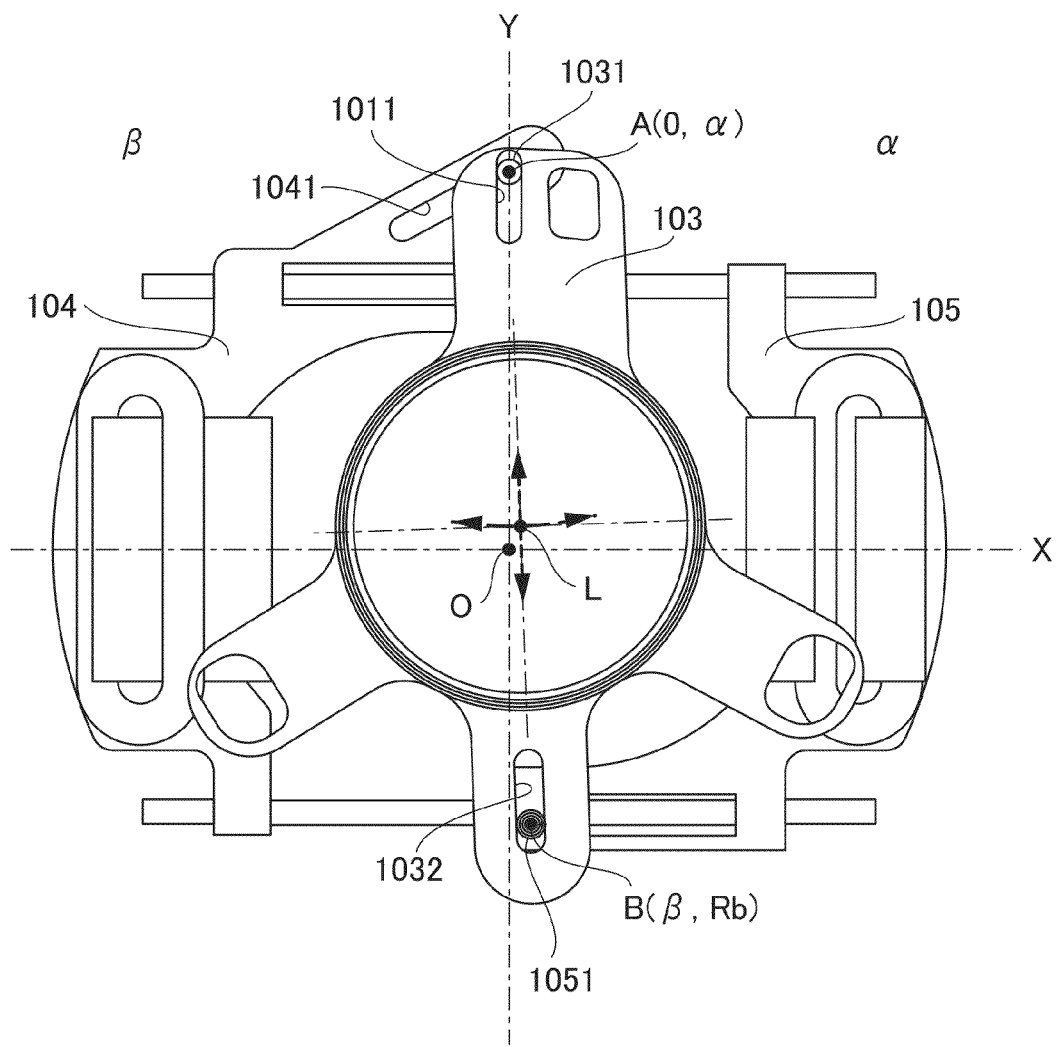
FIG. 5 is a diagram illustrating operations of an image shake correction apparatus.
Figure 6:
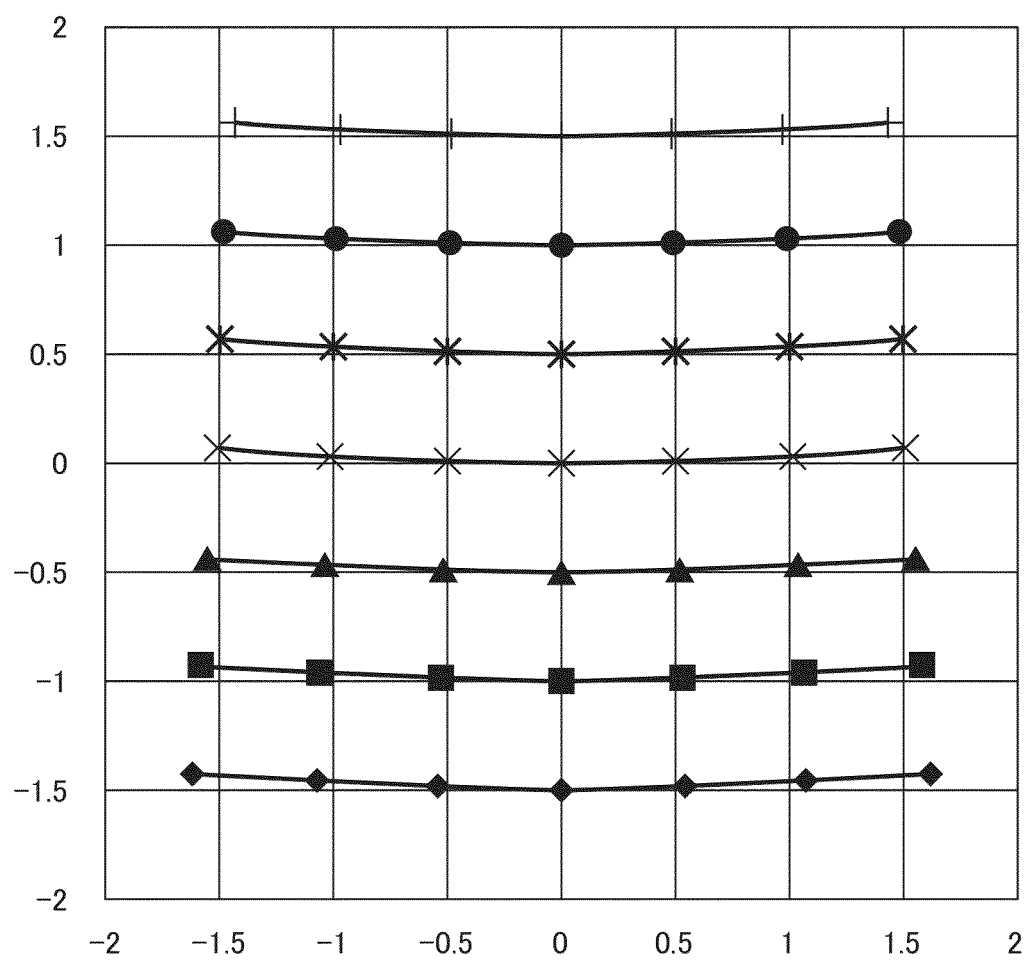
FIG. 6 is one example of operations of an image shake correction apparatus.

Next, the positioning and operation of the lens holding member 103 in First embodiment are described with reference to FIGS. 5 and 6. FIG. 5 is a diagram illustrating operation of the image shake correction apparatus. In FIG. 5, only the fixed guide groove 1011, the lens holding member 103, the first moving member 104, the second moving member 105, the first drive unit 106, the second drive unit 107, the first guide shaft 108, and the second guide shaft 109 are shown. FIG. 6 gives one example of a locus of the center of the image shake correcting lens 102.

As described above, the lens holding member 103 is determined its position in the optical axis direction by being supported by the rolling balls 110. Furthermore, one point on the lens holding member 103 is positioned by guiding the first drive pin 1031 of the lens holding member 103 to the intersection of the fixed guide groove 1011 and the cam groove 1041. The angular direction of the lens holding member 103 is then determined by engagement of the elongate hole 1032 with the second drive pin 1051 provided in the second moving member. As a result of the foregoing, the position of the lens holding member 103 is uniquely determined. In this state, the image shake correcting lens 102 can be moved to any position on a plane perpendicular to the optical axis by moving the first moving member 104 and the second moving member 105 to a prescribed position.

In the case where the first moving member 104 is moved in a state where the second moving member 105 is stationary, the drive pin 1031 is forced out of the cam groove 1041, and moves along the fixed guide groove 1011. The lens holding member 103 moves while the elongate hole 1032 is being guided by the drive pin 1031.

As the angles formed by the fixed guide groove 1011 and the elongate hole 1032 are parallel or nearly parallel angles, the center of the image shake correcting lens 102 moves approximately linear as shown by the dotted-line arrow marks in FIG. 5. More precisely, motion of the lens holding member 103 is accompanied by a slightly rotational movement according to the position of the drive pin 1051. The direction of movement of the lens holding member 103 in the case where the first moving member 104 is moved in a state where the second moving member 105 is stationary as described above is the first direction in the present embodiment. That is, the first moving member 104 is coupled with the drive pin 1031, and moves the lens holding member 103 in the first direction via the drive pin 1031.

On the other hand, in the case where the second moving member 105 is moved in a state where the first moving member 104 is stationary, the second moving member 105 turns the lens holding member 103 with the drive pin 1031 as the center of rotation. Accordingly, the center of the image shake correcting lens 102 can be moved so that the locus of movement is an arc. The center of the image shake correcting lens 102 moves in a direction along the broken-line arrow marks of FIG. 5. Otherwise, in order to realize this motion, the first drive pin must be a rotating body having the shape of a rotating central shaft, i.e., at least a portion thereof having a columnar, cylindrical or conical shape or the like. The direction of movement of the lens holding member 103 in the case where the second moving member 105 is moved in a state where the first moving member 104 is stationary as described above is the second direction in the present embodiment. That is, the second moving member 105 is coupled with the elongate hole 1032, and moves the lens holding member 103 in the second direction via the elongate hole 1032.

By combining movements of the lens holding member 103 in the aforementioned first direction and second direction, the image shake correcting lens 102 can be moved to any position in the plane. The image shake correcting lens 102 used in the present embodiment is a rotationally symmetrical body using the optical axis as its central axis. Accordingly, there will be no problem with rotational movement of the lens holding member 103 centering on the optical axis if only the center position of the image shake correcting lens 102 is accurately positioned.

On the other hand, if a non-rotationally symmetrical body such as an imaging element is used as the correcting member, it would require a countermeasure such as use within a range that allows the effects of rotation to be disregarded, use of a separate rotary mechanism between the lens holding member and the image shake correcting unit, or the like.

Movement of the image shake correcting lens 102 will be described in further detail. In FIG. 5, the center of the optical axis when the lens holding member 103 is at the center of its range of mobility is designated as an origin O. The Y axis is assumed to be parallel to the guide direction of the fixed guide groove 1011 from the origin, and the X axis is assumed to be the direction perpendicular to the Y axis. The center point of the first drive pin 1031 is designated as point A, the center point of the second drive pin 1051 is designated as point B, and the center point of the image shake correcting lens 102 is designated as point L.

A distance from point A to point L is designated as l. Point A moves in a Y axis form, and point B moves in the direction of the X axis. When an amount of movement of point A is designated as α, an amount of movement of point B is designated as β, and a distance of the origin O in the locus of point B is considered as Rb, point A and point B can be expressed by the following Formula (1) and Formula (2).

$$\overrightarrow{OA} = (0, \alpha) \ldots \tag{1}$$

$$\overrightarrow{OB} = (\beta, R_b) \ldots \tag{2}$$

In the present embodiment, point L is disposed on a straight line AB. Therefore, the locus of point L can be expressed by the following formula (3).

$$\overrightarrow{OL} = (L_x, L_y) = \overrightarrow{OA} + \frac{\overrightarrow{AL}}{|\overrightarrow{AB}|} \overrightarrow{AB} \tag{3}$$

$$= (0, R_a) + \frac{l}{\sqrt{\beta^2 + (R_b - \alpha)^2}} (\beta, R_b - \alpha)$$

As one example, a motion of point L when Rb=−12 and l=15.5 is shown in FIG. 6. In FIG. 6, a locus of point L according to variation of β when the value of α is fixed is displayed as linked in a curve. By determining the positions of the first moving member 104 and the second moving member 105 in this manner, the central position of the image shake correcting lens 102 can be moved to a prescribed in-plane position.

Next, the effects obtained by the image shake correction apparatus of First embodiment will be described. In the image shake correction apparatus 100, the loci of movement of the first moving member 104 and the second moving member 105 are respectively one-dimensional, and two-dimensional movement of the movable member is achieved by combining movements of the two moving members. Accordingly, even when one voice coil motor is driven, the relative positional relationship of the magnet and the coil configuring the other voice coil motor does not change. That is, the second drive unit 107 drives the second moving member 105 independently of driving of the first moving member 104 by the first drive unit 106. As a result, even when one voice coil motor is driven, the efficiency of the other voice coil motor does not decline, enabling achievement of an image shake correction apparatus that increases efficiency of the drive units.

In the present embodiment, a flat voice coil motor is used, but it is also acceptable to employ a drive unit system that conducts driving in only one direction such as a motor using a feed screw. That is, in order to achieve goals pertaining to cost, accuracy, and the like, the drive unit applied in the present invention can be selected from among various types of motors.

By guiding the first drive pin 1031 to the intersection of the fixed guide groove 1011 and the cam groove 1041 as in the present embodiment, the direction of movement of the first moving member 104 can be freely set in any direction. However, as the intersection of the fixed guide groove 1011 and the cam groove 1041 must move according to movement of the first moving member 104, it is necessary for the first moving member 104 to move in a direction other than the guide direction of the cam groove 1041.

Consequently, in the present embodiment, the direction of movement of the first moving member 104 and the direction of movement of the second moving member 105 are made parallel. By this means, avoidance of interference between the first moving member 104 and the second moving member 105 is facilitated, enabling downsizing of the image shake correction apparatus.

According to the present embodiment, there is the effect that it is possible to share a means for guiding the first moving member 104 and a means for guiding the second moving member 105.

It is also possible to use a type of motor configured by a magnet and a yoke in the first drive unit 106 in the second drive unit 107, as in the present embodiment. With respect to the magnet and the yoke, by disposing one in the movable member and the other in the fixed unit, a portion of the drive unit can be used as a means of energizing the movable member. That is, the movable member is fixed to either the aforementioned magnet or yoke. By this means, even in the case where the movable member is supported in a rolling manner as in the present embodiment, the movable member can be energized in the optical axis direction without addition of new parts.

In addition, by disposing the first drive unit 106 in the second drive unit 107 so as to sandwich the movable member, it is possible to stabilize the aforementioned energizing force that is exerted on the movable member. This is explained with reference to FIG. 3. In the exemplary configuration shown in FIG. 3, the movable member is disposed between the first drive unit 106 and the second drive unit 107 in a plane perpendicular to the optical axis. Generally, the movable member is configured roughly as a rotating body centered on the optical axis, and its center of gravity is approximately in the vicinity of the optical axis of the image shake correcting lens 102. As shown in FIG. 3, the first drive unit 106 and the second drive unit 107 are symmetrically arranged, sandwiching the optical axis. Consequently, the energizing force exerted on the movable member is symmetrically disposed, sandwiching the center of gravity. Therefore, according to the image shake correction apparatus of the present embodiment, energizing force can be stably exerted on the movable member.

(Second Embodiment)

Next, an image shake correction apparatus of second embodiment is described with reference to FIGS. 7 to 9. Components of the image shake correction apparatus of second embodiment that are identical to the components of the image shake correction apparatus 100 of first embodiment are assigned the same code numbers, and description thereof is omitted.

Figure 7:
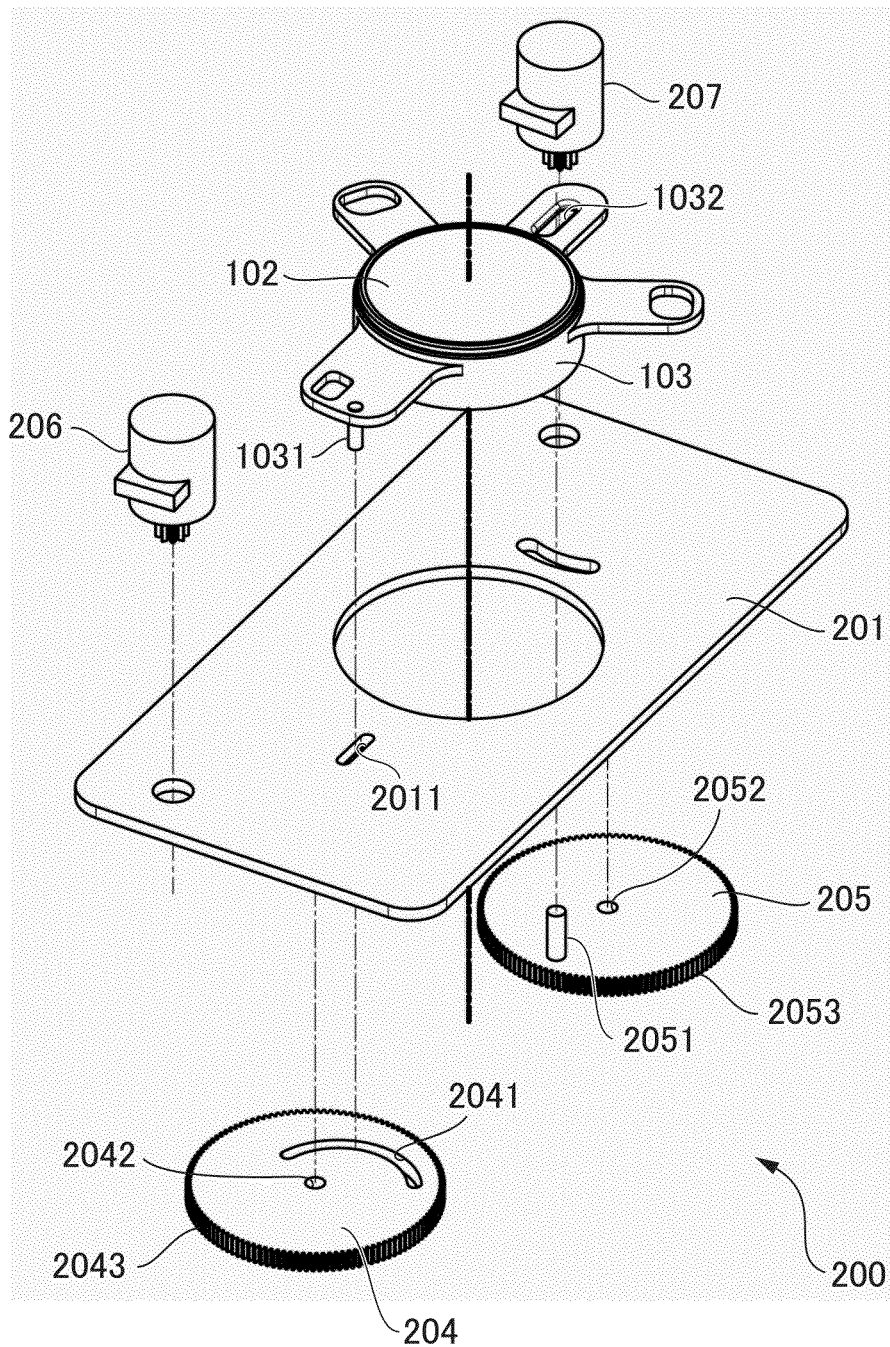
FIG. 7 is an exploded perspective view of an image shake correction apparatus of second embodiment.
Figure 8:
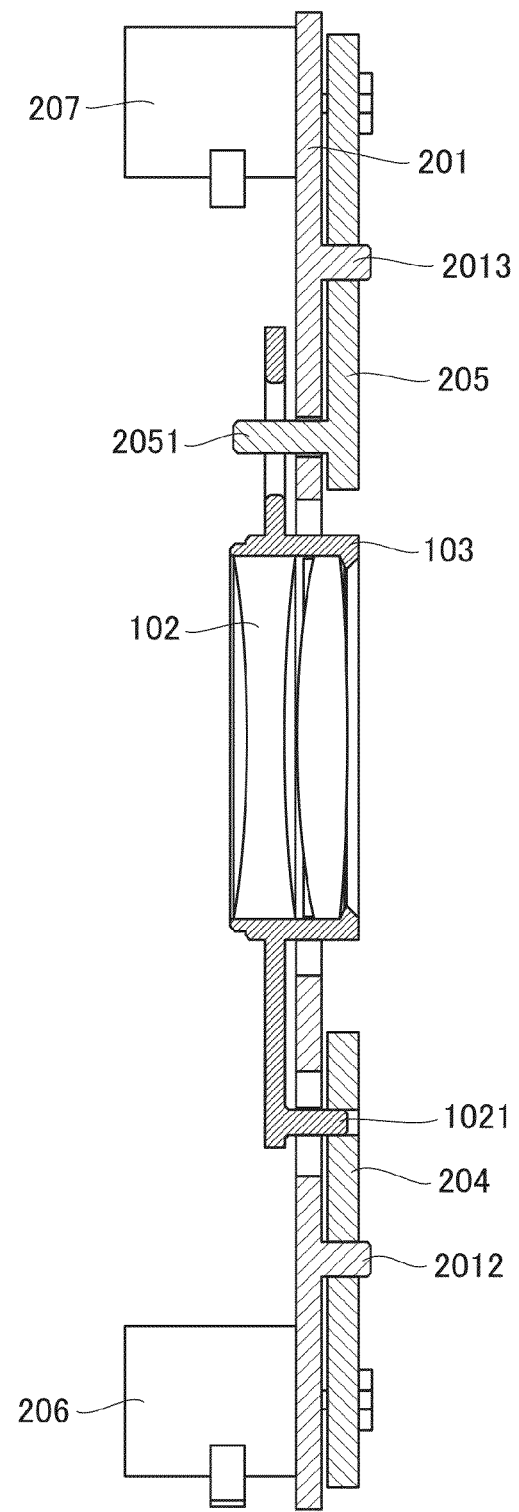
FIG. 8 is a cross-sectional view of the image shake correction apparatus of FIG. 7 after assembly.

FIG. 7 is an exploded perspective view illustrating a component configuration of an image shake correction apparatus 200 presented in the present embodiment. FIG. 8 is a cross-sectional view in a plane parallel to the optical axis of the image shake correction apparatus after assembly.

The image shake correction apparatus 200 of second embodiment is provided with a fixed ground plate 201, the image shake correcting lens 102, the lens holding member 103, a first moving member 204, a second moving member 205, a first drive unit 206, and a second drive unit 207.

The fixed ground plate 201 is formed in an approximately tabular shape, and is fixed to a lens barrel that fixes another lens group (e.g., an imaging optical system). In a central region, it has an aperture that is larger than the contour of the lens holding member 103, allowing use as an optical path. The fixed ground plate 201 also has a fixed guide groove 2011 extending in the yaw direction. In addition, the fixed ground plate 201 is provided with a first rotary shaft 2012 capable of rotatably supporting the first moving member 204, and a second rotary shaft 2013 capable of rotatably supporting the second moving member 205. The first rotary shaft 2012 and the second rotary shaft 2013 are mutually parallel.

The first moving member 204 is formed on an approximate disk. The first moving member 204 has a cam groove 2041, and a bearing part 2042 that fits together with a first bearing 2012, and is provided with a gear 2043 at its periphery. With respect to the cam groove 2041, when a rotational angle of the first moving member is designated as $\alpha$, and a distance from the rotary shaft to the center of the cam groove 2041 is designated as Ra, the center of the cam groove 2041 can be expressed by Ra=k$\alpha$ (k is a constant), resulting in a so-called Archimedean helix.

The second movable member 205 is formed on an approximate disk. It has a second drive pin 2051, and a bearing part 2052 that fits together with a second bearing 2013, and is provided with a gear 2053 at its periphery. The first drive unit 206 is a stepping motor that is well known. A pinion is attached to the rotary shaft, enabling transmission of rotation to the first moving member 204. The second drive unit 207 is a stepping motor that is part of the public domain. A pinion is attached to the rotary shaft, enabling transmission of rotation to the second moving member 205.

Next, a description is given of the structure of the image shake correction apparatus 200. The lens holding member 103 that holds the image shake correcting lens 102 is movably supported on the fixed ground plate 201 in a plane perpendicular to the optical axis by a method that is not illustrated in the drawings. For example, as in first embodiment, the lens holding member 103 is movably supported on the fixed ground plate 201 in a plane perpendicular to the optical axis by rolling balls and an energizing means.

Apart from the case of a planar form as in first embodiment, a plane perpendicular to the optical axis may also be on a curve such that the optical axis always coincides with the normal-line direction. As an example of such a curved plane, there is a spherical surface in which the optical axis is always oriented toward the center of the sphere.

The first moving member 204 is rotatably supported on the fixed ground plate 201 by the first rotary shaft 2012. The first drive unit 206 is attached to the fixed ground plate 201, and can rotate the first moving member 204. The second moving number 205 is rotatably supported on the ground plate 201 by the second rotary shaft 2023. The second drive unit 207 is attached to the fixed ground plate 201, and can rotate the second moving member 205.

Figure 9:
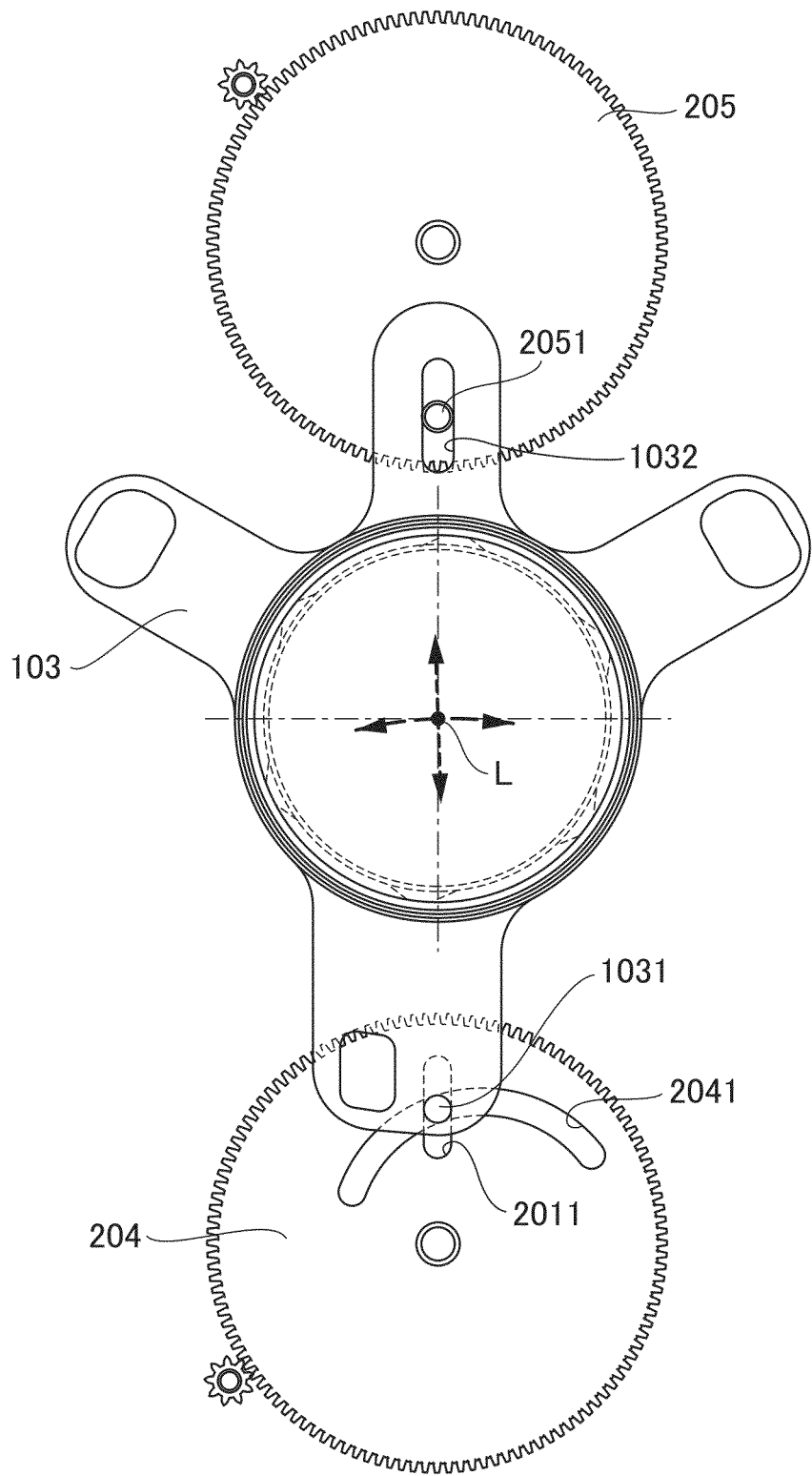
FIG. 9 is a diagram illustrating operations of an image shake correction apparatus.

Next, a description is given of the positioning and operations of the lens holding member 103 with reference to FIG. 9. FIG. 9 is a diagram for purposes of illustrating operations of an image shake correction apparatus. FIG. 9 displays only the fixed guide groove 2011, the lens holding member 103, the first moving member 204, the second moving member 205, and a portion of the first drive unit 206 and the second drive unit 207.

As described above, the position of the lens holding member 103 in the optical axis direction is determined by a method not illustrated in the drawings. Furthermore, one point on the lens holding member 103 is positioned by guidance of the first drive pin 1031 of the lens holding member 103 by the fixed guide groove 2011 and the cam groove 2041. An angular direction of the lens holding member 103 is then determined by engagement of an elongate hole 1032 by the second drive pin 2051 provided in the second moving member. By means of the foregoing, the position of the lens holding member 103 is uniquely determined. In this state, the image shake correcting lens 102 can be moved to any position on a plane perpendicular to the optical axis by rotating the first moving member 204 and the second moving member 205 to a prescribed position.

In the case where the first moving member 204 is rotated in a state where the second moving member 205 is stationary, the drive pin 1031 is forced out of the cam groove 2041, and moves along the fixed guide groove 2011. The lens holding member 103 moves while the elongate hole 1032 is guided by the drive pin 2051.

As the angles formed by the fixed guide groove 2011 and the elongate hole 1032 are parallel or nearly parallel angles, the center of the image shake correcting lens 102 undergoes approximately linear movement as shown by the dotted-line arrow marks in FIG. 9. As described above, the direction of movement of the lens holding member 103 in the case where the first moving member 204 is rotated in a state where the second moving member 205 is stationary is the first direction in the present embodiment. As the fixed guide groove 2011 in the present embodiment is made to extend in a linear manner in the yaw direction, the first drive pin 2031 moves in the yaw direction. The direction of movement of the first drive unit 2041 can be altered by making the first guide unit 2011 into a desired shape such as a curve.

On the other hand, in the case where the second moving member 105 is rotated in a state where the first moving member 104 is stationary, the lens holding member 103 undergoes rotational movement centering on the drive pin 1031. Accordingly, the center of the image shake correcting lens 102 can be moved so that the trajectory of movement is an arc. That is, the center of the image shake correcting lens 102 is moved in the directions along the broken-line arrow marks in FIG. 9. As described above, the direction of movement of the lens holding member 103 in the case where the second moving member 105 is rotated in a state where the first moving member 104 is stationary is the second direction in the present embodiment.

By combining movements of the lens holding member 103 in the aforementioned first direction and second direction, the image shake correcting lens 102 can be moved to any position in the plane.

Next, the effects obtained by the image shake correction apparatus of second embodiment are described. In first embodiment, the first moving member and the second moving member move translationally. On the other hand, it is possible to determine a position of the lens holding member 103 in a plane perpendicular to the optical axis even when the first moving member and the second moving member move rotationally, as in second embodiment. As the moving members and the drive units only conduct rotational movement without concomitant translational movement when the first and second moving members are rotationally moved as in the present embodiment, achievement of downsizing is facilitated, and avoidance of interference with other parts during operation is promoted. Use of rotary motors such as stepping motors to drive moving members that rotate is also promoted. In addition, deceleration of the motor via gears is facilitated.

Moreover, different directions of movement of the first moving member and second moving member can also be implemented. For example, if the first moving member undergoes translational movement, and the second moving member undergoes rotational movement, the movable member can be positioned at any location in a plane perpendicular to the optical axis.

In first embodiment, voice coil motors were employed as the first and second drive units. On the other hand, in the present embodiment, stepping motors are employed as the first and second drive units. Thus, there is no limitation on the drive principle of the drive unit in the present invention, and motors that are well known can be used.

(Third Embodiment)

Next, an image shake correction apparatus of third embodiment is described with reference to FIGS. 10 to 12. Components of the image shake correction apparatus of third embodiment that are identical to the components of the image shake correction apparatus of first embodiment and second embodiment are assigned the same code numbers, and description thereof is omitted.

An image shake correction apparatus 300 of third embodiment is provided with a fixed ground plate 301, the image shake correcting lens 102, a lens holding member 303, a first moving member 304, a second moving member 305, the first drive unit 206, the second drive unit 207, and a first deceleration gear 308. The image shake correction apparatus 300 is also provided with a second deceleration gear 309, a biasing spring 310, and a cover 311.

Figure 10:
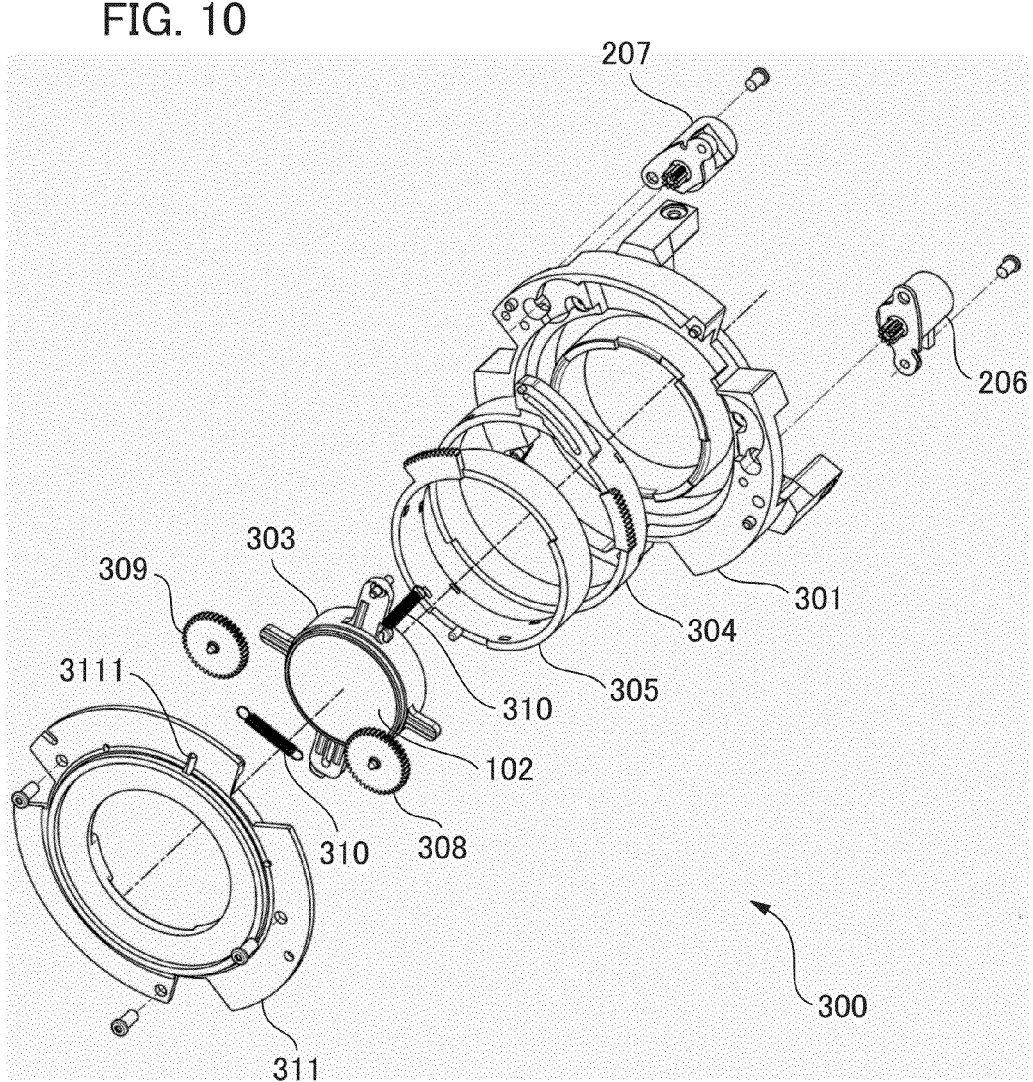
FIG. 10 is an exploded perspective view of an image shake correction apparatus of third embodiment.
Figure 11:
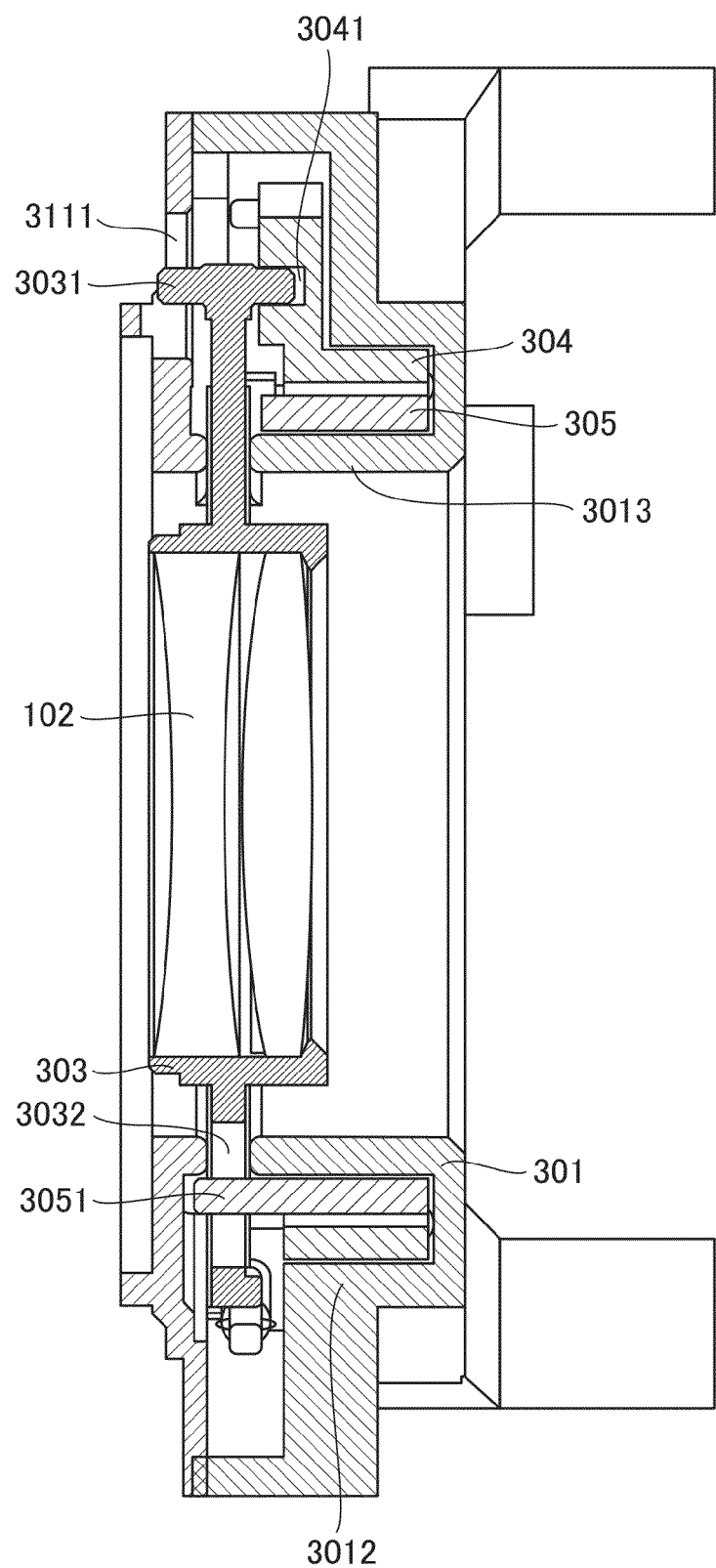
FIG. 11 is a cross-sectional view of the image shake correction apparatus of FIG. 10 after assembly.

FIG. 10 is an exploded perspective view illustrating a component configuration of the image shake correction apparatus of third embodiment. FIG. 11 is a cross-sectional view of the image shake correction apparatus after assembly in a plane parallel to the optical axis. FIG. 12 is a diagram that serves to describe operations of the image shake correction apparatus. In FIG. 12, only the fixed ground plate 301, a fixed guide groove 3111, the lens holding member 303, the first moving member 304, and the second moving member 305 are displayed.

The fixed ground plate 301 is formed in an approximately cylindrical shape, and is fixed to a lens barrel that fixes another lens group (e.g., an imaging optical system). The fixed ground plate 301 has an aperture at its center that is larger than the contour of the lens holding member, and can be used as an optical path. The fixed ground plate 301 is provided with a first rotary shaft 3012 capable of supporting the first moving member 304 at the outer periphery, and a second rotary shaft 3013 capable of supporting the second moving member 305 at the inner periphery.

The lens holding member 303 can hold the image shake correcting lens 102 in a central aperture. The lens holding member 303 is provided with a first drive pin 3031 and an elongate hole 3032. The first drive pin 3031 functions as a first connecting unit, and the elongate hole 3032 functions as a second connecting unit.

The first drive pin 3031 fits together with the fixed guide groove 3111 provided in the cover 311, and a cam groove 3041 provided in the first moving member 304. The elongate hole 3032 fits together with the second drive pin 3051 provided in the second moving member 305. The lens holding member 303 has sliding surfaces 3033 that extend radially at the perimeter of the lens holding unit and that are perpendicular to the optical axis. By interposing the sliding surfaces 3033 between the fixed ground plate 301 and the cover 311, the lens holding member 303 is movably supported in a fixed range in a plane perpendicular to the optical axis.

The first moving member 304 is formed in an approximately toric shape. An outer peripheral portion is supported by the first rotary shaft 3012, and is rotatably supported by the fixed ground plate 301. The first moving member 304 has a cam groove 3041, and a gear 3042 is provided on a portion of its outer periphery.

The second moving member 305 is formed in an approximately toric shape. The second moving member 305 is axially supported by the second rotary shaft 3013 at its inner periphery, and is rotatably supported by the fixed ground plate 301. The second moving member 304 has a second drive pin 3051, and a gear 3052 is provided on a portion of its outer periphery.

The first deceleration gear 308 is configured by a large gear and a small gear that are coaxial and that have different numbers of teeth, and is rotatably supported by the fixed ground plate. The first deceleration gear 308 decelerates rotation of the first drive unit 206, and transmits it to the first moving member 304.

The second deceleration gear 309 is configured by a large gear and a small gear that are coaxial and that have different numbers of teeth, and is rotatably supported by the fixed ground plate. The second deceleration gear 309 decelerates rotation of the second drive unit 207, and transmits it to the second moving member 305.

The biasing spring 310 is a tension spring, and generates energizing force between the fixed ground plate 301 and the lens holding member 303. In the present embodiment, there are some backlash generating factors such as engagement backlash of the first and second moving members, engagement backlash of the first and second drive pins, and so on. The biasing spring 310 can compensate for these backlashes. Otherwise, two biasing springs are used in the present embodiment, but any number of springs may be used at desired positions provided that they bias backlash of a movable lens barrel.

The cover 311 has a fixed guide groove 3111. The fixed guide groove 3111 is a linear groove that passes through the central axis of the moving member, and that is oriented toward the outer side, and enables engagement of the first drive pin 3031. The cover 311 configures the fixed member by connecting to the fixed ground plate 301. By sandwiching the sliding surfaces 3033 of the lens holding member between itself and the fixed ground plate 301, the cover 311 can movably support the lens holding member 303 in a plane perpendicular to the optical axis.

Next, a description is given of the structure of the image shake correction apparatus of third embodiment. The lens holding member 303 which holds the image shake correcting lens 102 is movably supported on the fixed ground plate 301 in a plane perpendicular to the optical axis, because it is sandwiched between the fixed ground plate 301 and the cover 311 as described above.

The first moving member 304 is rotatably supported on the fix ground plate 301 by the first rotary shaft 3012. The first drive unit 206 is attached to the fixed ground plate 301, and can rotate the first moving member 304 while conducting deceleration with the first deceleration gear 308.

The second moving member 305 is rotatably supported on the fixed ground plate 301 by the second rotary shaft 3023. The second drive unit 207 is attached to the fixed ground plate 301, and can rotate the first moving member 304 while conducting deceleration with the second deceleration gear 310.

Next, the positioning and operation of the lens holding member is described with reference to FIG. 12. The position of the lens holding member 303 in the optical axis direction is determined as described above. Furthermore, one point on the lens holding member is positioned by guidance of the first drive pin 3031 of the mobile lens barrel by the fixed guide groove 3111 and the cam groove 3041. An angular direction of the lens holding member is then determined by engagement of an elongate hole 3032 by the second drive pin 3051 provided in the second moving member. By means of the foregoing, the position of the lens holding member 303 is uniquely determined. In this state, the image shake correcting lens 102 can be moved to any position on a plane perpendicular to the optical axis by rotating the first moving member 304 and the second moving member 305 to a prescribed position.

In the case where the first moving member 304 is rotated in a state where the second moving member 305 is stationary, the drive pin 3031 is forced out of the cam groove 3041, and moves along the fixed guide groove 3111. The lens holding member 303 moves while the elongate hole 3032 is guided by the drive pin 3051.

Figure 12:
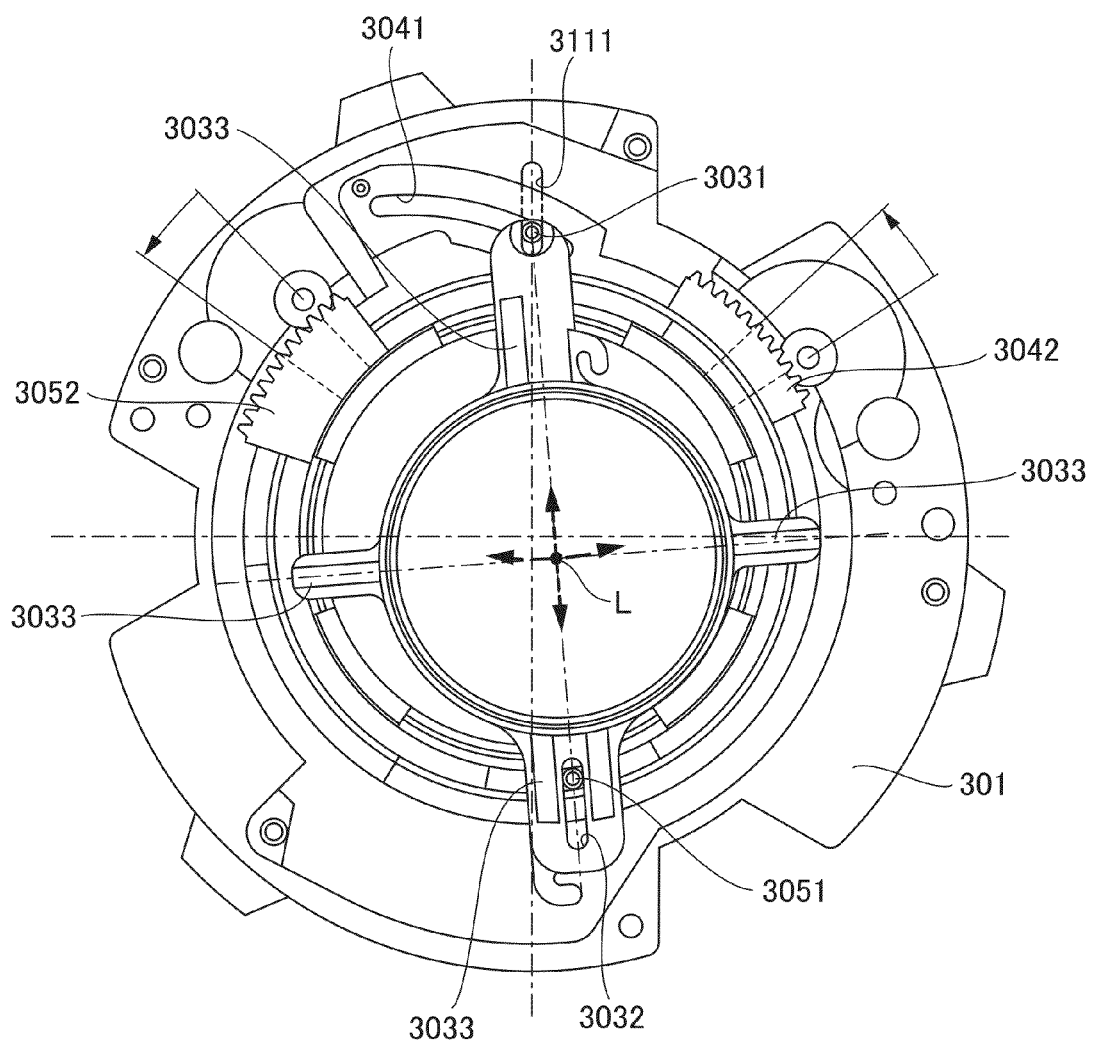
FIG. 12 is a diagram illustrating operations of an image shake correction apparatus.

As the angles formed by the fixed guide groove 3111 and the elongate hole 3032 are parallel or nearly parallel angles, the center of the image shake correcting lens 102 undergoes approximately linear movement as shown by the dotted-line arrow marks in FIG. 12. As described above, the direction of movement of the lens holding member 303 in the case where the first moving member 304 is rotated in a state where the second moving member 305 is stationary is the first direction in the present embodiment.

On the other hand, in the case where the second moving member 305 is rotated in a state where the first moving member 304 is stationary, the lens holding member 303 moves rotationally centering on the drive pin 3031. Accordingly, the center of the image shake correcting lens 102 can be moved so that the trajectory of movement is an arc. That is, the center of the image shake correcting lens 102 is moved in the directions along the broken-line arrow marks in FIG. 12. As described above, the direction of movement of the lens holding member 303 in the case where the second moving member 305 is rotated in a state where the first moving member 304 is stationary is the second direction in the present embodiment.

By combining movements of the lens holding member 303 in the aforementioned first direction and second direction, the image shake correcting lens 102 can be moved to any position in the plane.

By making the first moving member and the second moving member coaxial as in the present embodiment, it is possible to make combined use of a space from the rotational center of the first moving member to the cam groove 3041, and a space from the rotational center of the second moving member to the second drive pin 3051. By this means, downsizing of the image shake correction device can be achieved.

(Fourth Embodiment)

Next, an image shake correction apparatus of fourth embodiment is described with reference to FIGS. 13 to 15. Components identical to those of the preceding embodiments are assigned the same reference numbers, and description thereof is omitted.

An image shake correction apparatus 400 of the present embodiment is provided with a fixed ground plate 401, the image shake correcting lens 102, a lens holding member 403, a first moving member 404, a second moving member 405, a first drive unit 406, and a second drive unit 407. The image shake correction apparatus 400 is also provided with a first main guide shaft 4081, a first sub-guide shaft 4082, a second main guide shaft 4091, and a second sub-guide shaft 4092. The first drive unit 406 is provided with a first coil 4061, a first magnet 4062, and first yokes 4063 and 4064. The second drive unit 407 is provided with a second coil 4071, a second magnet 4072, and second yokes 4073 and 4074.

Figure 13:
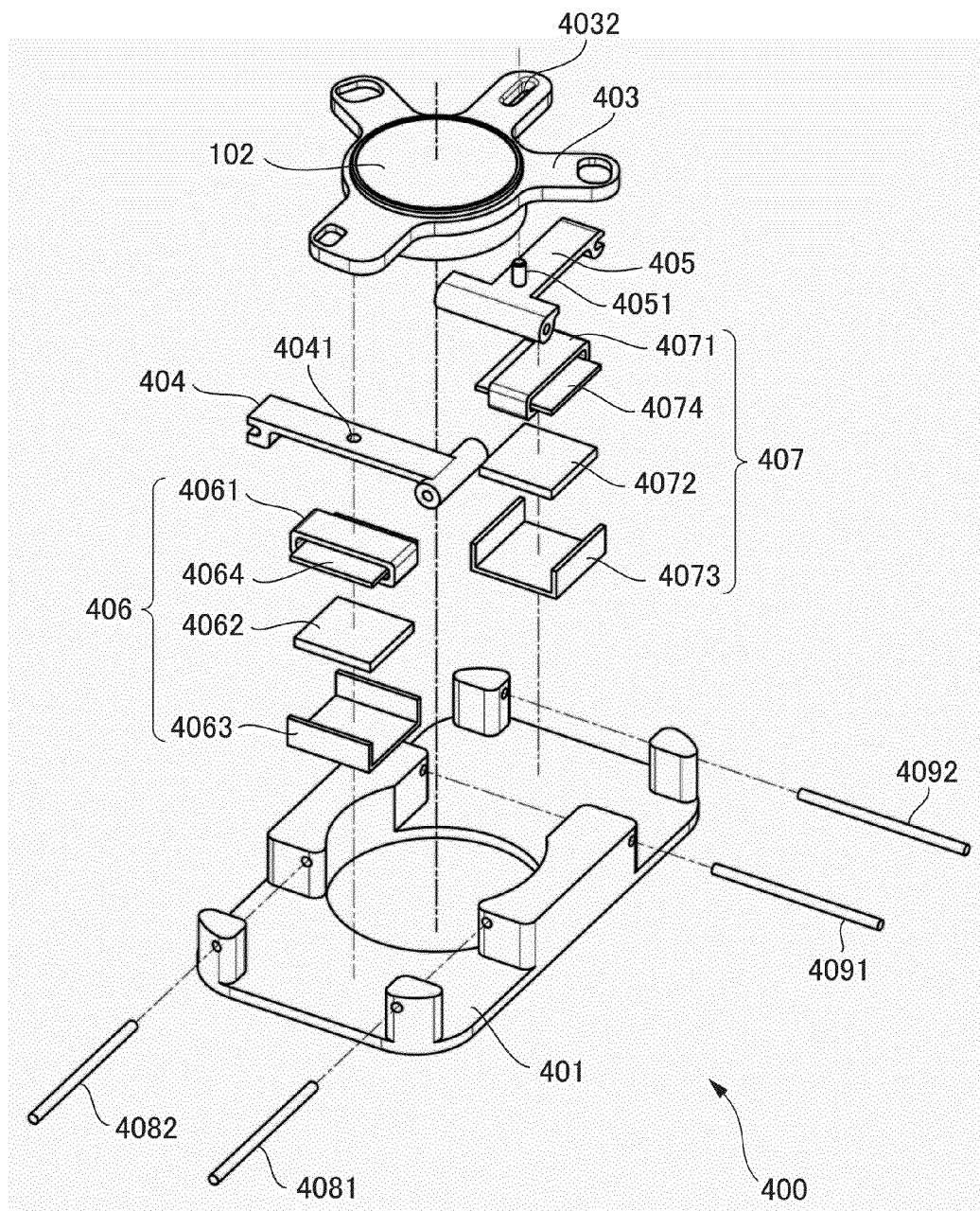
FIG. 13 is an exploded perspective view of an image shake correction apparatus of fourth embodiment.
Figure 14:
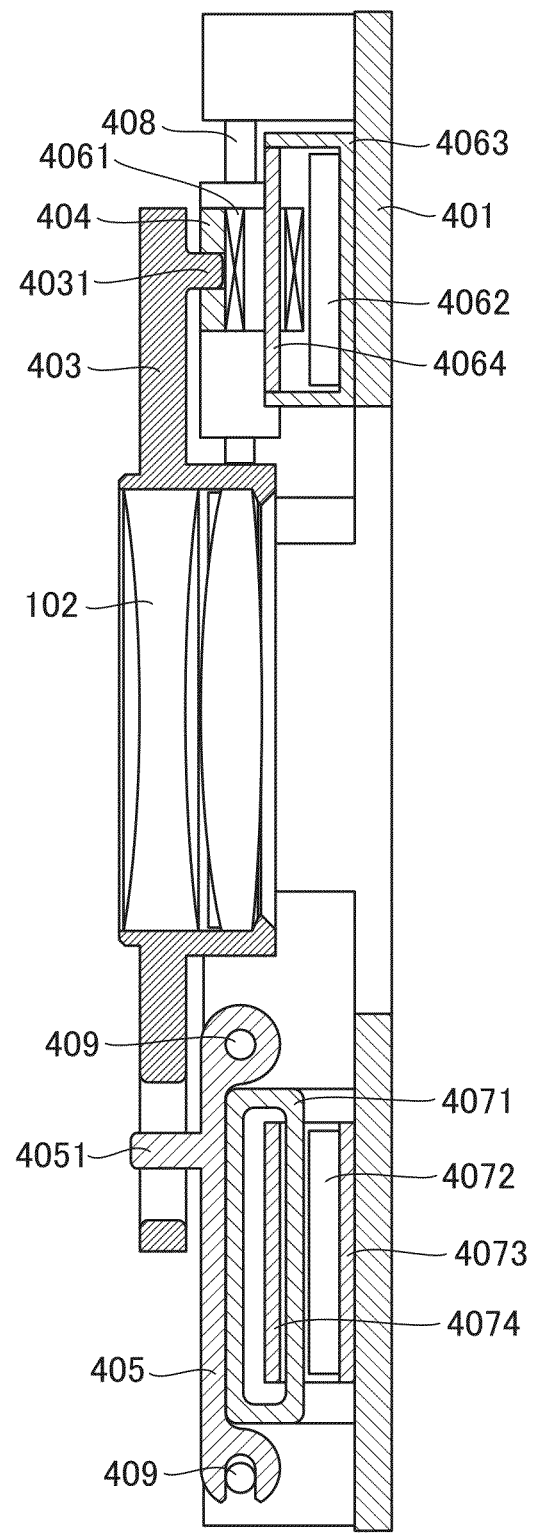
FIG. 14 is a cross-sectional view of the image shake correction apparatus of FIG. 13 after assembly.

FIG. 13 is an exploded perspective view illustrating a component configuration of the image shake correction apparatus 400 of fourth embodiment. FIG. 14 is a cross-sectional view of the image shake correction apparatus after assembly in a plane parallel to the optical axis. FIG. 15 is a diagram that serves to describe operations of the image shake correction apparatus. FIG. 15 displays only the lens holding member 403, the first moving member 404, the second moving member 405, the first main guide shaft 4081, the first sub-guide shaft 4082, the second main guide shaft 4091, and the second sub-guide shaft 4092.

The fixed ground plate 401 is formed in an approximately tabular shape and is fixed to a lens barrel that fixes another lens group (an imaging optical system). The fixed ground plate 401 has an aperture at its center that is larger than the contour of the lens holding member 403, allowing it to be used as an optical path. The fixed ground plate 401 has a guide shaft holding unit which holds the first main guide shaft 4081 and the first sub-guide shaft 4082 so as to extend in the pitch direction. The fixed ground plate 401 also has a guide shaft holding unit which holds the second main guide shaft 4091 and the second sub-guide shaft 4092 so as to extend in the yaw direction.

The lens holding member 403 is able to hold the image shake correcting lens 102 in its central aperture. The lens holding number 403 is provided with a first drive pin 4031 and an elongate hole 4032. The first drive pin 4031 functions as a first connecting unit, and the elongate hole 4032 functions as a second connecting unit.

The first drive pin 4031 fits together with a connecting hole 4041 provided in the first moving member 404. The elongate hole 4032 fits together with a second drive pin 4051 provided in the second moving member 405.

The first moving member 404 is provided with a sleeve unit that engages with the first main guide shaft 4081, a coil attachment unit that holds the first coil 4061, and a rotation stopping unit that engages with the first sub-guide shaft 4082. The first moving member 404 also has the connecting hole 4041 on a portion of the coil attachment unit, and this connecting hole 4041 fits together with the first drive pin 4031.

The second moving member 405 is provided with a sleeve unit that engages with the second main guide shaft 4091, a coil attachment unit that holds the second coil 4071, and a rotation stopping unit that engages with the second sub-guide shaft 4092. The second moving member 405 also has the second drive pin 4051 on a portion of the coil attachment unit, and this second drive pin 4051 fits together with the elongate hole 4032.

The first coil 4061 is a coil that is wound with the yaw direction as the central axis. By fixing it to the first moving member 404, and supplying it with power by a method that is not illustrated in the drawings, Lorentz force is generated that is perpendicular to the current and the magnetic field.

The first magnet 4062 is an approximately tabular magnet, and is magnetized with different poles on the front surface and rear surface. By attaching it to the first yokes so that a magnetized surface opposes the first coil 4061, a magnetic field can be produced in a direction perpendicular to the current that flows to the coil.

The first yokes 4063 and 4064 consist of soft magnetic material, and are capable of effectively exerting the magnetic field produced by the first magnet 4062 on the first coil 4061. By combining 4063 that has a U-shaped cross-sectional surface and 4064 that is tabular, it is possible to surround one side of the second coil 4061 as shown in FIG. 14.

The second coil 4071 is a coil that is wound with the pitch direction as the central axis. By fixing it to the first moving member 404, and supplying it with power by a method that is not illustrated in the drawings, Lorentz force is generated that is perpendicular to the current and the magnetic field.

The second magnet 4072 is an approximately tabular magnet, and is magnetized with different poles on the front surface and rear surface. By attaching it to the second yokes so that a magnetized surface opposes the first coil 4071, a magnetic field can be produced in a direction perpendicular to the current that flows to the coil.

The second yokes 4073 and 4074 consist of soft magnetic material. By combining the second yoke 4073 that has a U-shaped cross-sectional surface and the second yoke 4074 that is tabular, it is possible to surround one side of the second coil 4071 as shown in FIG. 14.

The first main guide shaft 4081 is a columnar member that extends in the yaw direction. It is preferably manufactured from metal such as stainless steel that has a high degree of slideability, precision, and strength. The first main guide shaft 4081 guides the first moving member 404 in the yaw direction by engaging with the sleeve unit of the first moving member 404.

The first sub-guide shaft 4082 is a columnar member that extends in the yaw direction. It is preferably manufactured from metal such as stainless steel that has a high degree of slideability, precision, and strength. The first sub-guide shaft 4082 prevents rotation of the first moving member by engaging with the rotation stopper of the first moving member 404.

The second main guide shaft 4091 is a columnar member that extends in the pitch direction. It is preferably manufactured from metal such as stainless steel that has a high degree of slideability, precision, and strength. The second main guide shaft 4091 guides the second moving member 405 in the pitch direction by engaging with the sleeve unit of the second moving member 405.

The first sub-guide shaft 4092 is a columnar member that extends in the pitch direction. It is preferably manufactured from metal such as stainless steel that has a high degree of slideability, precision, and strength. The second sub-guide shaft 4092 prevents rotation of the first moving member by engaging with the rotation stopper of the second moving member 405.

Next, a description is given of the detailed structure of the image shake correction apparatus of fourth embodiment. Guided by the first main guide shaft and the first sub-guide shaft held in the fixed ground plate 401, the first moving member 404 is supported so that it is capable of moving in the yaw direction. Guided by the second main guide shaft 4081 and the second sub-guide shaft 4091 held in the fixed ground plate 401, the second moving member 405 is movably supported in the pitch direction.

The first drive unit 406 configures a so-called cylindrical voice coil motor. The first magnet 4062 is attached to the U-shaped cross-sectional part 4063 of the first yoke. The tabular part 4064 of the first yoke is then disposed so as to oppose a magnetized portion of the first magnet 4062, and is disposed with interposition of the first coil 4061. By this means, the magnetic field generated by the first magnet 4062 can be effectively exerted on the first coil 4061.

The first yoke and the first magnet 4062 are attached to the fixed ground plate 401, and the first coil 4061 is attached to the first moving member 404. When the first coil 4061 is energized in this state, the first moving member 404 can be driven in the yaw direction which is the winding direction of the coil.

The second drive unit 407 configures a so-called cylindrical voice coil motor. The second magnet 4072 is attached to the U-shaped cross-sectional part 4073 of the second yoke. The tabular part 4074 of the second yoke is then opposed so as to face a magnetized portion of the second magnet 4072, and is disposed with interposition of the second coil 4071. By this means, the magnetic field generated by the second magnet 4072 can be effectively exerted.

The second yoke and the second magnet 4072 are attached to the fixed ground plate 401, and the second coil 4071 is attached to the second moving member. When the second coil 4071 is energized in this state, the second moving member 405 can be driven in the pitch direction which is the winding direction of the coil.

Figure 15:
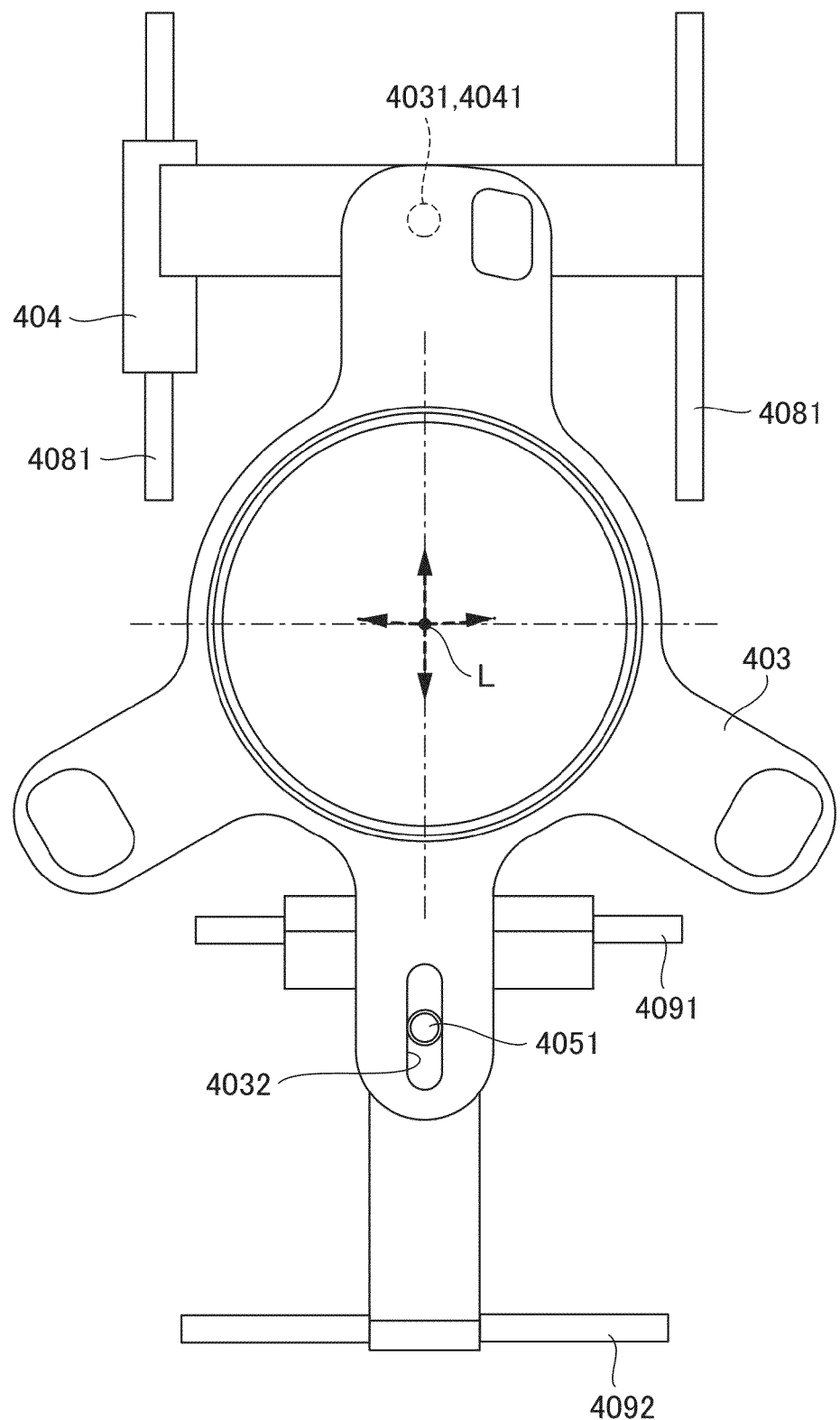
FIG. 15 is a diagram illustrating operations of an image shake correction apparatus.

Next, a description is given of the positioning and operation of the lens holding member of fourth embodiment with reference to FIG. 15. FIG. 15 is a diagram illustrating operations of the image shake correction apparatus. The position of the lens holding member 403 and the optical axis direction is determined by a method that is not illustrated in the drawing. Furthermore, one point on the lens holding member 403 is positioned by engagement of the first drive pin 4031 of the lens holding member 403 with the connecting hole 4041. An angular direction of the lens holding member 403 is then determined by engagement of the elongate hole 4032 by the second drive pin 4051 provided in the second moving member 405. The position of the lens holding member 403 is uniquely determined in the foregoing manner. In this state, the image shake correcting lens 102 can be moved to any position on a plane perpendicular to the optical axis by rotating the first moving member 404 and the second moving member 405 to a prescribed position.

In the case where the first moving member 404 is moved in the yaw direction in a state where the second moving member 405 is stationary, the drive pin 3031 also moves in the yaw direction. The lens holding member 403 moves while guiding the elongate hole 4032 to the drive pin 4051. At this time, as the angles formed by the elongate hole 3032 and the direction of movement of the first moving member are parallel or nearly parallel angles, the center of the image shake correcting lens 102 undergoes approximately linear movement as shown by the dotted-line arrow marks in FIG. 15. The direction of movement of the lens holding member 403 in the case where the first moving member 404 is moved in a state where the second moving member 405 is stationary as described above is the first direction in the present embodiment.

On the other hand, in the case where the second moving member 405 is moved in the pitch direction in a state where the first moving member 404 is stationary, the lens holding member 403 moves rotationally centering on the drive pin 4031. Accordingly, the center of the image shake correcting lens 102 can be moved so that the trajectory of movement is an arc. That is, the center of the image shake correcting lens 102 moves in a direction along the broken-line arrow marks in FIG. 15. The direction of movement of the lens holding member 403 in the case where the second moving member 405 is moved in a state where the first moving member 404 is stationary as described above is the second direction in the present embodiment.

By combining movements of the lens holding member 403 in the aforementioned first direction and second direction, the image shake correcting lens 102 can be moved to any position in the plane.

In fourth embodiment, the first drive pin provided in the movable member is driven by the first moving member 404 without contacting the fixed ground plate 401. As the movable member is moved to any position in the plane even by this method, it is possible to achieve a configuration in which the first and second moving members are moved in only one direction. Therefore, according to the present invention, it is possible to obtain the effect of avoiding reduced efficiency of the first and second drive units, and the effect of allowing use of motors capable of only one-directional movement as the drive units.

In the above-described first embodiment to third embodiment, the first drive pin provided in the movable member is guided by the fixed guide groove provided in the fixed ground plate. By this means, the movable member can be moved in the guide direction of the fixed guide groove regardless of the direction of movement of the first moving member, enabling limitation of the direction of movement of the first moving member to be reduced. On the other hand, in fourth embodiment, the movable member is moved in the direction of movement of the first moving member. Consequently, in order to move the movable member to any prescribed position in the plane, the direction of movement of the first moving member and the direction of movement of the second moving member must be approximately perpendicular.

(Fifth Embodiment)

Next, a description is given of an image shake correction apparatus of fifth embodiment with reference to FIGS. 16 to 18A-D. Components identical to those of the above-described embodiments are assigned the same code numbers, and description thereof is omitted.

Figure 16:
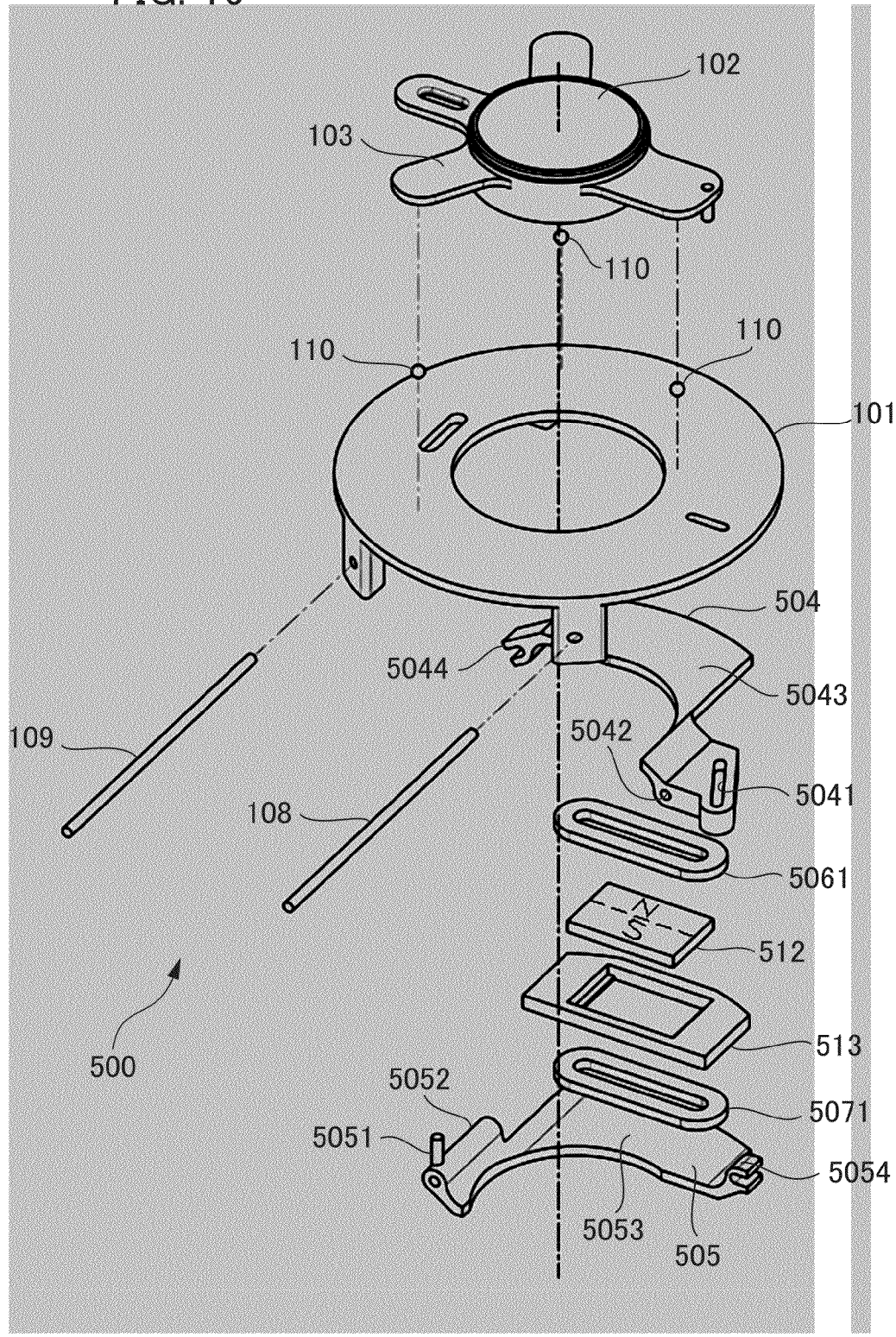
FIG. 16 is an exploded perspective view of an image shake correction apparatus of fifth embodiment.
Figure 17:
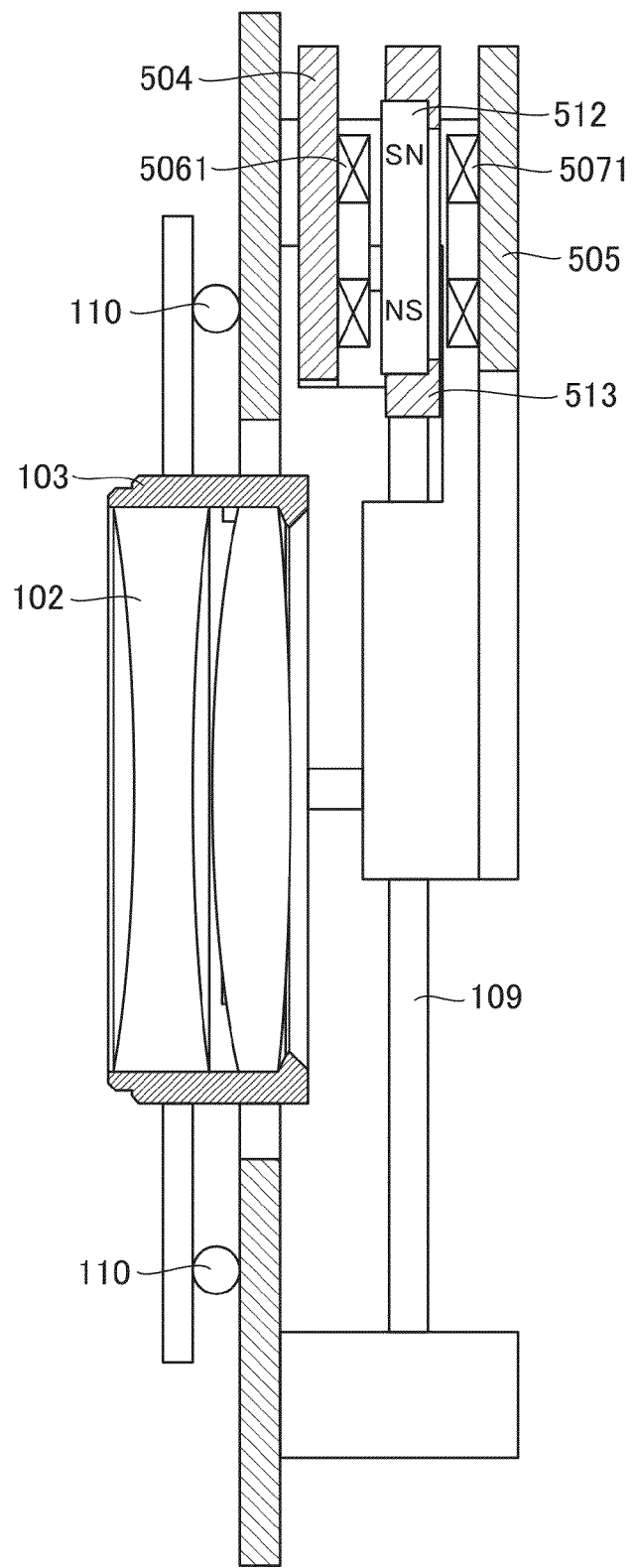
FIG. 17 is a cross-sectional view of the image shake correction apparatus of FIG. 16 after assembly.

FIG. 16 is an exploded perspective view illustrating a component configuration of the image shake correction apparatus of fifth embodiment. FIG. 17 is a cross-sectional view of the image shake correction apparatus after assembly in a plane parallel to the optical axis.

The image shake correction apparatus 500 of fifth embodiment is provided with the fixed ground plate 101, the image shake correcting lens 102, the lens holding member 103, a first moving member 504, a second moving member 505, a first coil 5061, and a second coil 5071. The image shake correction apparatus 500 is also provided with the first guide shaft 108, the second guide shaft 109, the rolling balls 110, a magnet 512, and a magnet holder 513. A first drive member is configured by the first coil 5061 and the magnet 512. The first coil 5061 is fixed to the first moving member 504. A second drive member is configured by the second coil 5071 and the magnet 512. The second coil 5071 is fixed to the second moving member 505.

As with the first moving member 104 of first embodiment, the first moving member 504 is configured by a cam groove 5041, a sleeve unit 5042 that engages with the first guide shaft 108, a coil holder 5043 that holds the second coil, and a rotation prevention unit 5044 that engages with the second guide shaft 109. By this means, the first moving member 504 is held so that it is capable of translational movement in the direction of extension of the first guide shaft 108.

The second moving member 505 is configured by a second guide shaft 5051, a sleeve unit 5052 that engages with the second guide shaft 109, a coil holder 5053 that holds the second coil, and a rotation prevention unit 5054 that engages with the first guide shaft 108. Guided by the first guide shaft 108 and the second guide shaft 109, the second moving member 505 is held so that it is capable of translational movement in the direction of extension of the second guide shaft 109. That is, the possible directions of movement of the first moving member 504 and the second moving member 505 are parallel.

As shown in FIG. 17, the second coil holding unit 5053 is configured to come to the same side as the first coil holding unit 5043.

The first drive unit is a voice coil motor that is part of the public domain, and is configured by the first coil 5061 and the magnet 512. The first coil 5061 is wound in an oval shape, and is attached to the first moving member 504. The first drive unit is energized by a power supply method not illustrated in the drawings, thereby generating Lorentz force in a direction perpendicular to the current. The first moving member 504 can be driven by conforming the direction in which this force is exerted to the direction of movement of the first moving member 504.

The second drive unit is a voice coil motor that is part of the public domain, and is configured by the second coil 5071 and the magnet 512. As shown in FIG. 17, the second coil 5071 is disposed so as to oppose the first coil 5061 in a state where the lens holding member 103 is at the center of its movable range.

The second coil 5071 is wound in an oval shape, and is attached to the second moving member 505. As a result of energization by a power supply method not illustrated in the drawings, Lorentz force is generated in a direction perpendicular to the current. The second moving member 505 can be driven by conforming the direction in which this force is exerted to the direction of movement of the second moving member 505. Otherwise, in the present embodiment, the drive direction of the first drive unit and the drive direction of the second drive unit are mutually parallel or on the same straight line.

The magnet 512 is a magnet on a thin parallelepiped. As shown in FIGS. 16 and 17, magnetization is conducted at N pole and S pole, with the wide surface divided in two. Moreover, the front surface and the rear surface are magnetized at opposite poles, and are disposed so as to respectively oppose the first coil 5061 and the second coil 5071. The magnet holder 513 is composed of non-magnetic material. The magnet 512 can be fixed to the fixed ground plate 101.

FIGS. 18A-D are cross-sectional drawings which describe the detailed structure of a drive unit of fifth embodiment. The cross-section shown in FIGS. 18A-D is a partial cross-section of the drive unit in a state where the movable member is positioned at the center of its movable range. This cross-section is parallel to the direction of magnetization of the magnet 512, and is a cross-section perpendicular to the current path of the coil. In FIGS. 18A-D, only the magnet 512, the first coil 5061, and the second coil 5071 are shown enlarged.

Figure 18A:
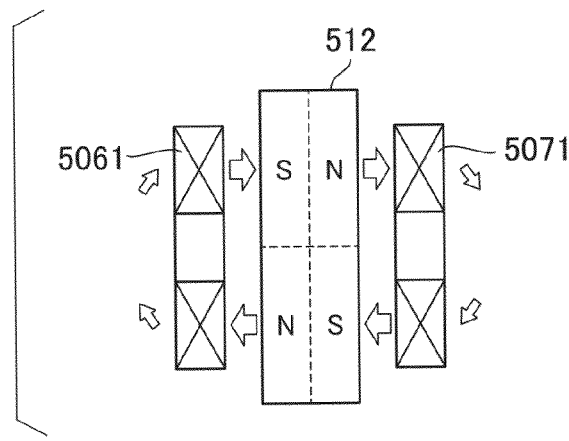
FIGS. 18A to 18D are diagrams illustrating structures of a drive unit.
Figure 18B:
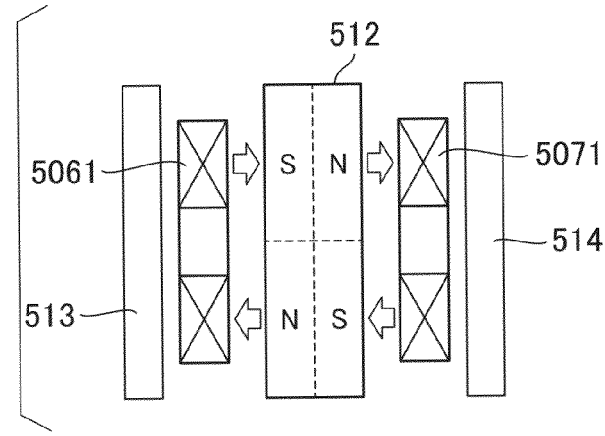

As shown in FIGS. 18A and 18B, the drive unit can adopt a configuration in which the magnet 512 is positioned between the first coil 5061 and the second coil 5071. In the exemplary configuration shown in FIG. 18A, the magnet 512 produces a magnetic flux that passes through the first coil 5061 and the second coil 5071, as shown by the white arrow marks in FIG. 18A. When the first coil 5061 is energized, Lorentz force perpendicular to the direction of magnetic flux and energization is generated in the coil, enabling production of drive force in the vertical direction in FIG. 18A.

When the second coil 5071 is energized, Lorentz force perpendicular to the direction of magnetic flux and energization is generated in the coil, enabling production of drive force in the vertical direction in FIG. 18A. As is clear from FIG. 18A, as the directions of the magnetic flux exerted in the first coil and the second coil are reversed, inverse drive forces are exerted when the directions of energization to the respective coils are made identical, and drive forces are exerted with the same orientation when the directions of energization are reversed.

When the two coils are energized, an interactive force is exerted between the respective coils. This force is attractive force if the energizing orientations are identical, and repulsive force if the energizing orientations are reversed. Accordingly, in a state where the first coil and the second coil are opposed, it is exerted in the lateral direction of FIG. 18A. As it is perpendicular to the drive directions of the respective drive units, there is no hindrance to drive force.

As shown in FIG. 18B, a first yoke 513 and a second yoke 514 respectively consisting of intensely magnetic material may be opposed to the surface side of the first coil and the second coil that does not oppose the magnet. By this means, even though the number of parts increases, the magnetic flux from the magnet 512 can be made into a closed magnetic path, enabling increased efficiency of the actuator.

Figure 18C:
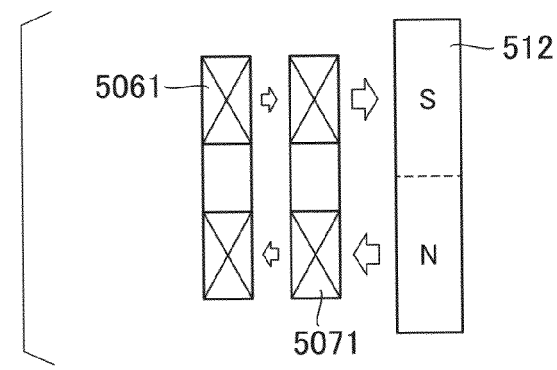

As shown in FIG. 18C, even in the case where arrangement is made in the order of the first coil 5061, the second coil 5071, and the magnet 512, it is possible to share the magnet of the first drive unit and the magnet of the second drive unit. In the exemplary configuration shown in FIG. 18C, one side of the magnet 512 opposes either the first coil 5061 or the second coil 5071, and the other side opposes neither the first coil 5061 nor the second coil 5071. In the case where the drive units adopt this configuration, it is sufficient if the magnet 512 is magnetized only on the side that opposes the second coil 5071. On the other hand, as the distance between the first coil 5061 and the magnet 512 is greater than the distance between the second coil 5071 and the magnet 512, the output of the first drive unit is less than the output of the second drive unit. Accordingly, it is necessary to adopt countermeasures such as increasing the amount of energization of the first coil, or decreasing the load to the first drive unit.

Figure 18D:
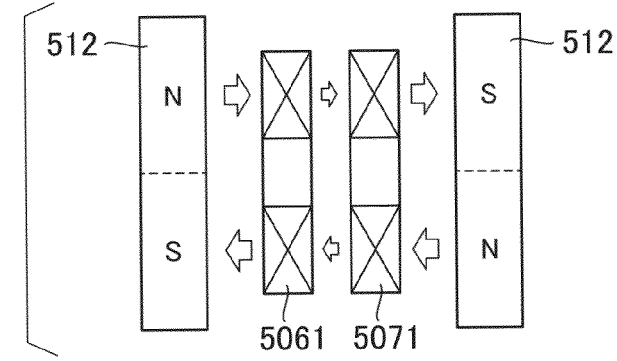

An arrangement like that shown in FIG. 18D can be obtained by adopting a configuration in which the magnet 512 is divided in two, or in which the magnet 512 is given a U-shape, with magnetization of the opposed surface(s) on the inner side. By this means, the distance from the first coil 5061 to the magnet 512 is made equal to the distance from the second coil 5071 to the magnet 512, enabling the output of the first drive unit and the output of the second drive unit to be made uniform. Apart from the configuration of the first drive unit and the second drive unit, the operations of the present embodiment are identical to the above-described fifth embodiment.

Next, a description is given of the effects obtained by the image shake correction apparatus of fifth embodiment. As described above, in the present embodiment, a voice coil motor is used in the first drive unit and the second drive unit. The first coil 5061 is attached to the first moving member 504, the second coil 5071 is attached to the second moving member 505, and the magnet 512 is then disposed between the first coil 5061 and the second coil 5071. By this means, the magnet used by the first drive unit and the second drive unit can be shared. By this means, the number of magnets can be reduced to one, enabling cost cutting by elimination of parts.

The respective configurations of FIGS. 18A-D can achieve the effect of sharing the magnet of the first drive unit and the magnet of the second drive unit. Among these, when the magnet 512 is disposed between the first coil 5061 and the second coil 5071, as in the configurations shown in FIGS. 18A and 18B, it is possible to make the outputs of the two drive units uniform without increasing the number of magnets or complicating their form.

By conducting arrangement in the order of the first coil 5061, the second coil 5062, and the magnet 512, as in the configurations shown in FIGS. 18C and 18D, it is acceptable if the magnetized surface of the magnet 512 is only the one surface that opposes the second coil 5062. By this means, simplification of the magnetic device can be anticipated.

In the present embodiment, a structure is adopted in which the first and second moving members undergo parallel translational movement. However, the effects of the present invention are not limited to this configuration, and the same configuration as described in third embodiment can be obtained with a configuration in which the first moving member and the second moving member undergo coaxial rotational movement. That is, voice coil motors are selected as the first drive unit and the second drive unit. A magnet is then disposed between the first coil attached to the first moving member and the second coil attached to the second moving member. By this means, it is possible to share the magnet of the first drive member and the magnet of the second drive member.

A description was given of an image shake correction apparatus in first to fifth embodiment described above, and the image shake correction apparatus can be incorporated into imaging devices such as video cameras, and digital and silver-salt still cameras, as well as optical equipment containing observation devices such as binoculars, telescopes, and field scopes. Accordingly, optical equipment having the image shake correction apparatus of the present invention also constitutes an aspect of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-225132 filed on Oct. 10, 2012 which is hereby incorporated by reference herein in its entirety.

What is claimed is:

1. An image shake correction apparatus, the apparatus comprising:
   a fixed member;

a movable member configured to hold a correcting member that corrects image shake, which is supported so as to be movable in a direction perpendicular to an optical axis relative to the fixed member, and configured to have a first connecting unit and a second connecting unit;

a first moving member connected to the first connecting unit, and configured to move the movable member in a first direction via the first connecting unit;

a second moving member connected to the second connecting unit, and configured to move the movable member in a second direction different from the first direction via the second connecting unit;

a first drive unit configured to drive the first moving member; and a second drive unit configured to drive the second moving member independently of driving of the first moving member by the first drive unit, wherein the first drive unit and the second drive unit share a constituent component, wherein the second moving member rotates the movable member using the first connecting unit as a center of rotation;

wherein the first and second moving members translationally move on a same straight line relative to the fixed member.

2. The image shake correction apparatus according to claim 1, wherein the first drive unit comprises a first magnet that is provided on the fixed member and a first coil that is provided on the first moving member so as to oppose the first magnet, and the second drive unit comprise a second magnet that is provided on the fixed member and a second coil that is provided on the second moving member so as to oppose the second magnet.

3. The image shake correction apparatus according to claim 1, wherein the first drive unit and the second drive unit respectively have a magnet and a plate-like member of soft magnetic material, wherein the movable member is disposed between the first drive unit and the second drive unit in a plane perpendicular to the optical axis, and wherein the movable member is fixed to either the magnet or the plate-like member.

4. An imaging device provided with the image shake correction apparatus according to claim 1.

5. An image shake correction apparatus, the apparatus comprising:

a fixed member;

a movable member configured to hold a correcting member that corrects image shake, which is supported so as to be movable in a direction perpendicular to an optical axis relative to the fixed member, and configured to have a first connecting unit and a second connecting unit;

a first moving member connected to the first connecting unit, and configured to move the movable member in a first direction via the first connecting unit;

a second moving member connected to the second connecting unit, and configured to move the movable member in a second direction different from the first direction via the second connecting unit;

a first drive unit configured to drive the first moving member; and a second drive unit configured to drive the second moving member independently of driving of the first moving member by the first drive unit, wherein the first drive unit and the second drive unit share a constituent component, wherein the fixed member has a first guide unit, wherein the first moving member has a second guide unit, wherein the second moving member has a third guide unit, wherein the first connecting unit of the movable member is guided by an intersection of the first guide unit and the second guide unit, and wherein the second connecting unit of the movable member is guided by the third guide unit.

6. The image shake correction apparatus according to claim 1, wherein the first drive unit and the second drive unit are arranged in parallel in the direction perpendicular to the optical axis.

7. The image shake correction apparatus according to claim 1, wherein the fixed member has a first guide unit, wherein the first moving member has a second guide unit, wherein the second moving member has a third guide unit, wherein the first connecting unit of the movable member is guided by an intersection of the first guide unit and the second guide unit, and wherein the second connecting unit of the movable member is guided by the third guide unit.

8. The image shake correction apparatus according to claim 1, wherein a direction of movement of the first moving member and a direction of movement of the second moving member are parallel.

* * * * *